US 6,586,696 B1

(12) United States Patent
Pronko et al.

(10) Patent No.: US 6,586,696 B1
(45) Date of Patent: Jul. 1, 2003

(54) METHOD FOR LASER INDUCED ISOTOPE ENRICHMENT

(75) Inventors: Peter P. Pronko, Dexter, MI (US); Paul A. Vanrompay, Ann Arbor, MI (US); John Nees, Ann Arbor, MI (US); Zhiyu Zhang, Ann Arbor, MI (US)

(73) Assignee: The Regents of the University of Michigan, Ann Arbor, MI (US)

(*) Notice: Subject to any disclaimer, the term of this patent is extended or adjusted under 35 U.S.C. 154(b) by 0 days.

(21) Appl. No.: 09/914,401

(22) PCT Filed: Mar. 9, 2000

(86) PCT No.: PCT/US00/06077
§ 371 (c)(1),
(2), (4) Date: Nov. 30, 2001

(87) PCT Pub. No.: WO00/56428
PCT Pub. Date: Sep. 28, 2000

Related U.S. Application Data

(60) Provisional application No. 60/177,135, filed on Jan. 20, 2000, and provisional application No. 60/125,942, filed on Mar. 24, 1999.

(51) Int. Cl.[7] .................................................. B01D 5/00
(52) U.S. Cl. ................................................. 204/157.22
(58) Field of Search .................................... 204/157.22

(56) References Cited

U.S. PATENT DOCUMENTS

| 3,940,615 A | * | 2/1976 | Kantrowitz .................. 250/284 |
| 3,992,625 A | * | 11/1976 | Schmidt et al. .............. 250/284 |
| 4,081,677 A | * | 3/1978 | Dawson ....................... 250/290 |
| 4,757,203 A | * | 7/1988 | Gil et al. ...................... 250/291 |
| 5,751,113 A | | 5/1998 | Yashnov et al. ......... 315/111.21 |
| 5,845,880 A | | 12/1998 | Petrosov et al. ............. 244/169 |
| 5,847,493 A | | 12/1998 | Yashnov et al. ........ 315/231.31 |
| 5,981,955 A | * | 11/1999 | Wong et al. ............. 250/423 R |

FOREIGN PATENT DOCUMENTS

WO    WO 97/20620    * 6/1997

OTHER PUBLICATIONS

References B–E and N were cited on the International Search Reports.*

* cited by examiner

Primary Examiner—Edna Wong
(74) Attorney, Agent, or Firm—Harness, Dickey & Pierce

(57) ABSTRACT

The invention provides new methods for separating isotopes of an element and causing enrichment of a desired isotope of an element utilizing laser ablation plasmas to modify or fabricate a material containing such isotopes. This invention may be used for a wide variety of materials which contain elements having different isotopes.

8 Claims, 17 Drawing Sheets

EXPERIMENTAL SETUP

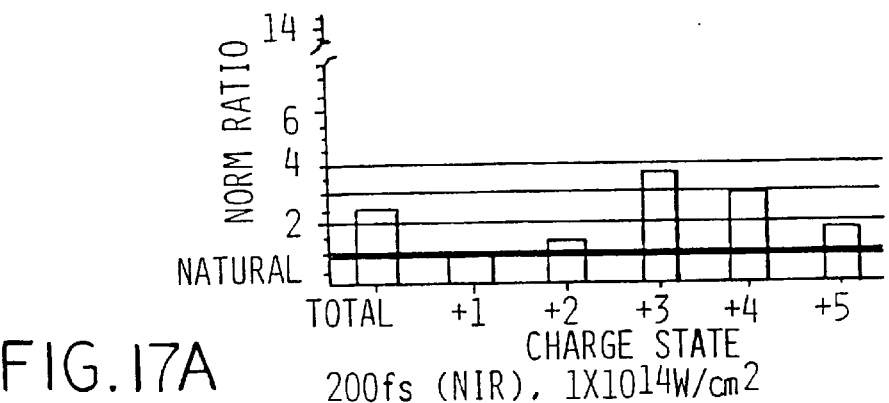
FIG.17A  200fs (NIR), 1X10¹⁴W/cm²
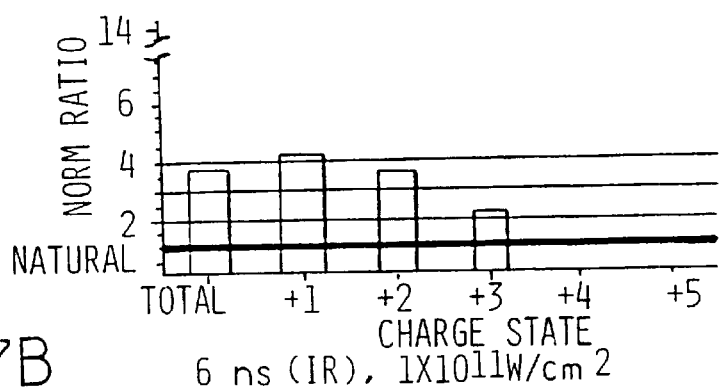
FIG.17B  6 ns (IR), 1X10¹¹W/cm²
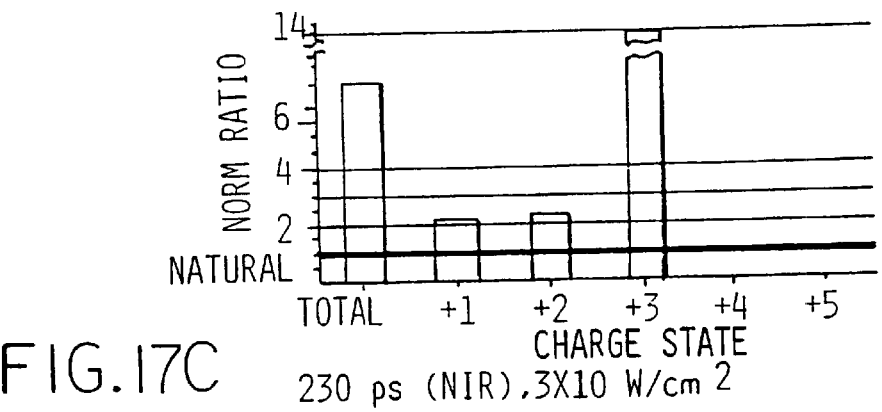
FIG.17C  230 ps (NIR), 3X10 W/cm²
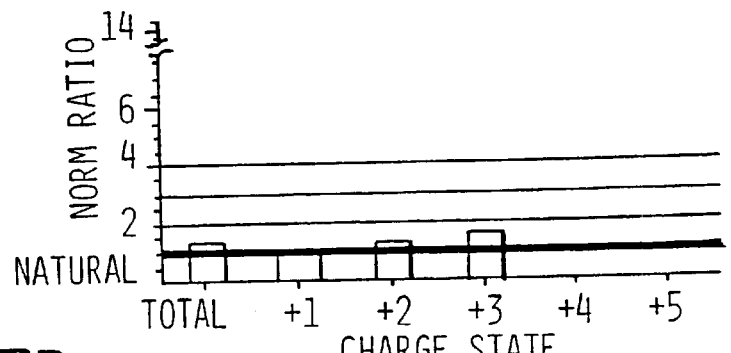
FIG.17D  6 ns (UV), 4X10⁹ W/cm²

METHOD FOR LASER INDUCED ISOTOPE ENRICHMENT

GOVERNMENT RIGHTS

This invention was made with government support provided by the National Science Foundation under Contract Number PHY-8920108. The government has certain rights in the invention.

FIELD OF THE INVENTION

This invention relates to methods for isotope enrichment.

BACKGROUND OF THE INVENTION

Selected isotopes are useful in a variety of applications. For example, it is often desired to have an isotopic marker present in a molecule to trace such molecule in biologic processes. Radioactive isotopes are used for curative purposes in cancer and for medical radiology. Isotopic enrichment is used by industry to control physical properties of materials such as thermal conductivity. Separation of isotopes is conventionally accomplished by a variety of means relying on difference in mass of isotopes. One example of this utilizes a gaseous diffusion process to separate heavier components of an isotopic mixture from the lighter components by reason of their differing mass. Physical separation by fractionation to isolate a particular desired isotope is also known. Conventionally, the most popular procedure for isotope enrichment is the gaseous-diffusion method, which depends on the relative rates of gaseous diffusion through molecular barriers by different isotopes of a given element. Such processes typically operate at reduced pressure and elevated temperature. Often the difference between the mass of the isotopes is very small and although the lighter weight isotope diffuses more rapidly through porous barriers, the separation by each barrier is very, very small, therefore, many or a cascade of barriers are required.

More recently, there has been an interest in attempting to cause isotope separation by multiple photon absorption and photoionization. These processes are labor intensive and difficult to accomplish. Typically, several iterations are required to achieve the high concentration of the desired isotopic component in the separated product. An example of separation by multiple photon absorption can be found in U.S. Pat. No. 4,655,890 where a mixture of molecules is irradiated with infrared laser radiation having a first wavelength which lies in close coincidence with the transition from the ground rotation-vibration level of the molecules which contain the isotopic variant of the element which is to be separated, and the next highest rotation-vibration level having vibrational excitation. This radiation selectively induces multiple photon absorption by those molecules. Then it is possible to cause the selectively excited molecules to undergo chemical reaction while other isotopic variance of the element remains substantially in their lower rotation-vibration levels and consequently unreactive, thereby causing a product of the chemical reaction of the selectively excited molecules to be produced and separable from the unreacted molecules.

WO 97/20620A discloses improvements in plasma apparatus for isotope enhancement.

SUMMARY OF THE INVENTION

The present invention provides novel processes and system apparatus for separating isotopes of an element and causing enrichment of a desired isotope of an element in a material. On one aspect, the invention utilizes lasers to modify or fabricate a material so as to produce a desired isotopic content in the material, which differs from that which naturally occurs. This invention may be used for a wide variety of materials which contain elements having different isotopes. In one aspect, the invention provides the ability to produce a material enriched in a desired isotope, and in another aspect the invention provides the ability to produce a material depleted of a given isotope. The reference to enhancement and depletion refers to a condition different from that which naturally occurs.

In a preferred embodiment, the present invention relies upon laser induced formation of a plasma by means of a pulsed laser beam. It is possible that continuous beams could also be used for this purpose. The material containing the isotopes desired to be separated is placed in the beam path and is called a target. A plasma is formed from the target material by focusing an intense, short duration optical pulse from the laser onto the target. The concentrated energy contained in the focused and/or concentrated laser beam ionizes the target material, energizing its electrons and raising it to a temperature or otherwise exciting it to a condition whereby ions are produced, thereby generating a plasma. The plasma contains ions having varying isotopes, ion energy and charge state distributions. In one aspect, the ions are contained in a plasma plume generated when one or more laser pulses are directed to a target. The process and system of the invention produce an unusual isotopic enhancement effect in the observed ion spectra. This effect is manifested as an enrichment of the lighter isotope in zones of the ablation plume, as observed normal to the surface of the target material. In one aspect, the method comprises directing the laser beam to the target at an intensity and wavelength sufficient to generate the plasma comprising ionized isotopic species and to generate an internal electromagnetic scattering field within the plasma causing spatial separation of the ionized isotopic species. In another aspect, the ions are collected on a substrate in a manner which provides zones having isotopic distribution different from that which naturally occurs for a given element contained in the target. It is preferred that the pulses which generate the plume be produced by an ultrafast laser (femtosecond or picosecond). It is preferred that the laser generates the plume by ablation or laser induced breakdown (LIB) of the target material. It is also possible to use long pulse (nanosecond or millisecond) lasers or even continuous beam lasers, with associated differences in efficiency.

The invention provides substantial advantages over conventional methods for separating isotopic components of an element. The invention further provides the ability to effectively enhance the isotopic content of a material as compared to the natural state. Products having desired isotope distribution are able to be produced from the process. The process and system are adaptable to commercial use and automated production. Therefore, isotope enriched products are obtainable by the methods and system of the invention.

Objects, features, and advantages of the invention include, in addition to the foregoing, an improved method and system for separating isotopes of an element, and particularly for forming product material having a desired isotopic content different from that which naturally occurs.

Another object is to provide a method for producing spatial isotopic separation.

Another object is to provide a method and system which utilize lasers to achieve isotope separation or enrichment at certain ablation or scattering angles.

Another object is to provide a method and system which utilize lasers to achieve isotopic separation or isotopic enrichment of a product.

Another object is to provide a method and system for producing products having a desired isotopic distribution.

Another object is to provide a method and system which effectively and economically achieve isotopic separation and isotopic enhancement in a product material.

These and other objects, features, and advantages will become apparent from the following description of the preferred embodiments and accompanying drawings.

BRIEF DESCRIPTION OF THE DRAWINGS

FIG. 2 shows individual charge states and kinetic energies for the ionic isotopes of boron obtained from a boron nitride target in a vacuum. The data of FIG. 2 was captured in the experimental apparatus as shown in FIG. 1. The laser pulse was supplied by a Ti:Sapphire CPA system.

FIG. 3 shows the charge state and energy distribution data for boron ions and its isotopes, as compiled from spectra such as that on FIG. 2. FIG. 3 has two parts. In FIG. 3 for the ion species of nitrogen, boron 10, and boron 11, there is shown data obtained from a cross sectional area transverse to the direction of ion movement and normal to the surface of the target. The data shows ion density in ions per square centimeter as a function of ion kinetic energy expressed in keV. The data of FIGS. 2 and 3 were obtained under the conditions of boron nitride ablation with laser pulses of 200 femtoseconds, 780 nanometers, 4 millijoules (mJ), 100 micron spot size, corresponding to $2.5 \times 10^{14}$ watts per square centimeter.

FIG. 4 shows data obtained in a cross sectional area transverse to the direction of ion movement and normal to the surface of the target. The data cross section shows ion density versus ion energy level similar to FIG. 3; and two conditions are shown, generation of the plume under vacuum (4A) and generation of the plume in a vacuum but with a partial pressure of nitrogen background gas (FIG. 4B). The laser pulse was supplied by an Nd:YAG laser system. The experimental system was otherwise as per FIG. 1.

FIG. 5 shows ion density similar to FIGS. 3 and 4, and using two conditions, in a vacuum (5A) and in a vacuum with nitrogen background gas (5B). The laser pulse was supplied by a Ti:Sapphire laser system. The experimental system was otherwise as per FIG. 1.

FIG. 7 shows individual charge states and kinetic energies for the ionic isotopes of gallium obtained from a gallium nitride target in a vacuum. The data of FIG. 7 was captured in the experimental apparatus as shown in FIG. 1. The laser pulse was supplied by a Ti:Sapphire CPA system.

FIG. 8 shows the charge state and energy distribution data for gallium ions and its isotopes, as compiled from spectra such as that on FIG. 7. FIG. 8 has two parts. In FIG. 8 for the ion species of gallium 69 and gallium 71, there is shown data obtained from a cross sectional area transverse to the direction of ion movement and normal to the surface of the target. The data shows ion density in ions per square centimeter as a function of kinetic energy expressed in keV. The data of FIGS. 7 and 8 were obtained under the conditions of gallium nitride ablation with laser pulses of 150 femtoseconds, 780 nanometers, 3.3 joules per square centimeter.

FIG. 9 shows plots of the ratios of $Ga^{69}/Ga^{71}$ for three cases.

FIG. 11 is a schematic representation of the data showing that the ratio of B(10) to B(11) in a central portion of the plume is greater than natural abundance.

FIG. 12 contains results for two samples, one designated as curve 6 and the other as curve 7. Curve 6 is for a relatively thin deposition zone of the sample and curve 7 is for a sample taken from a relatively thick zone of the deposited film (FIG. 11). Both sample spots of the film are on the order of 3 millimeters in diameter. The actual spots being analyzed on the film were separated by 5 spot diameters or 15 mm (i.e., 1.5 cm).

FIG. 13 contains data for a sample taken from a relatively thick zone of the deposited film. The sample spot on the film was on the order of 3 millimeters in diameter.

FIG. 14 consists of parts A, B and C. FIG. 14 charts B, C are RBS spectra similar to that shown in FIGS. 12 and 13 but with the Si background subtracted out. The solid lines are mathematical best fit curves based on the commercially available RUMP computer program available through Cornell University.

FIG. 17 shows isotopic ratios for boron as observed on the normal axis in various laser plasma plumes. Ratios are for B10/B11. Natural abundance ratio (0.25) is normalized to unity. Pulse durations, wavelengths and intensities are: (a) at 200 fs (NIR), $1\times10^{14}$ W/cm$^2$; (b) at 6 ns (IR), $1\times10^{11}$ W/cm$^2$; (c) at 230 ps (NIR), $3\times10^{10}$ W/cm$^2$; and (d) at 6 ns (UV), $4\times10^9$ W/cm$^2$; and where NIR=780 nm, IR=1.06 $\mu$m, UV=353 nm.

DETAILED DESCRIPTION OF THE PREFERRED EMBODIMENTS

Figure 1:
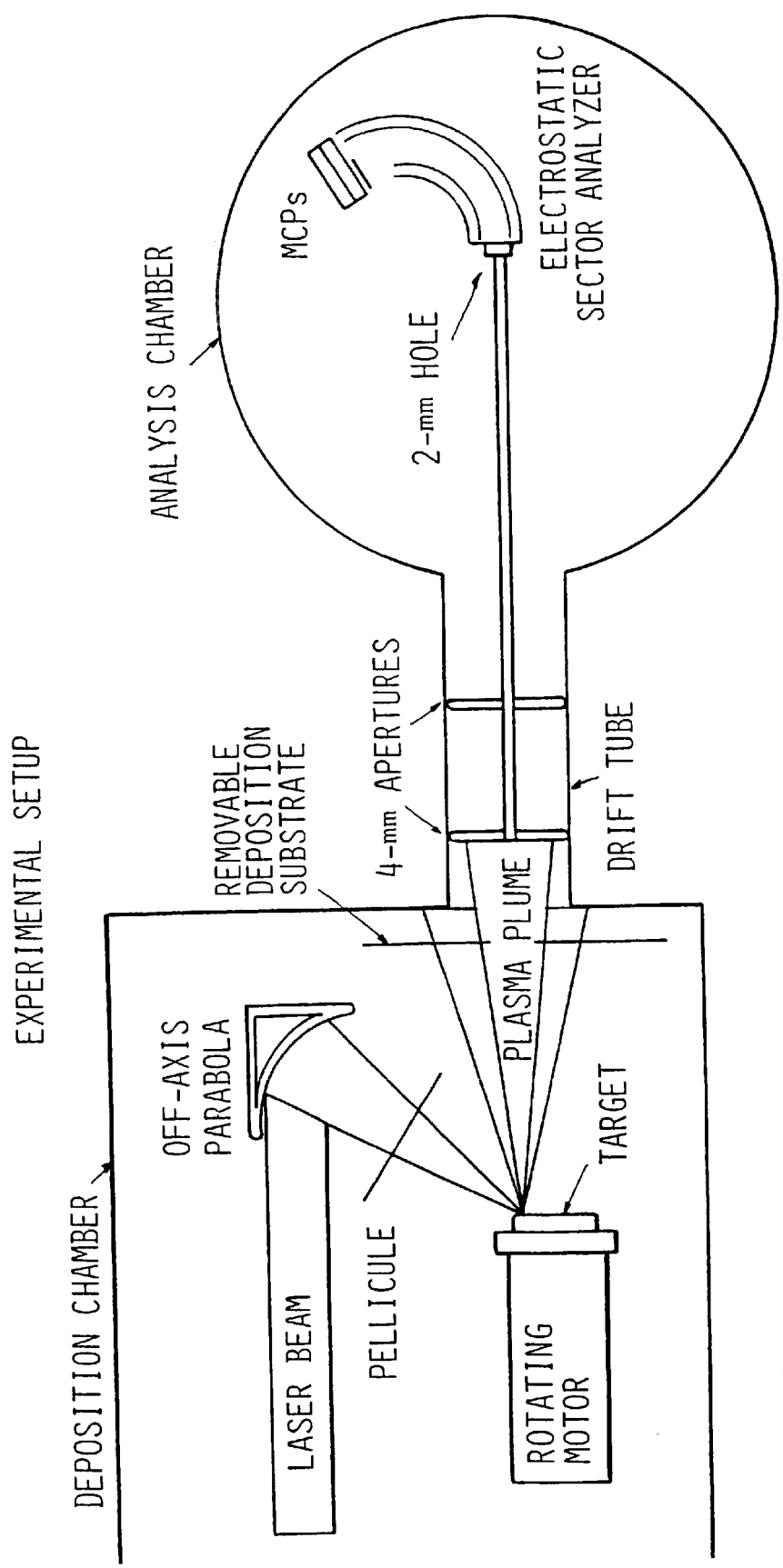
FIG. 1 is a schematic of a system for generating a plume containing ionized particles. It includes a deposition chamber which is preferentially under vacuum (but could be operated with a background gas at various pressures) and an analysis or collection chamber. An incoming laser beam is provided from an external laser source.

The invention provides new methods for separating isotopes of an element and causing enrichment of a desired isotope of an element utilizing lasers to modify or fabricate a material containing such isotopes. This invention may be used for a wide variety of materials which contain elements having different isotopes. Before further describing the invention, it is useful to understand the problem to which the invention is directed. In nature, elements such as boron, gallium, magnesium, carbon and many others, occur in stable isotopic form. For example, boron has two isotopes; boron 10, B(10), and boron 11, B(11). Nuclei with the same number of protons but different number of neutrons are called isotopes of each other. Therefore, isotopes of a given element have the same nuclear charge (protons), but the differing number of neutrons results in a differing atomic mass. For a given element, the amount of an isotope in its naturally occurring mixture of isotopes, is represented by a term designated as percent natural abundance. These natural abundance values are reported in a variety of Standard Chemistry and Physics Handbooks and other sources. Using boron as an example, it is known that boron 10 has a natural abundance on the order of 19.78% and boron 11 is about 80.22%. It is often desired to obtain a material enriched with one of the isotopes relative to the condition found in the natural state.

In one aspect, the present invention utilizes laser heating and other forms of laser induced breakdown of a material to cause ablation and formation of a plasma by means of a pulsed laser beam. Pulsed rather than continuous beams may be more effective for many procedures, including the formation of an ablation plume from a material containing isotopes desired to be separated. A pulsed laser beam comprises bursts or pulses of light which are of very short duration, for example, on the order of nanoseconds in duration or less. Typically, these pulses are separated by periods of quiescence. The peak power of each pulse is relatively high, capable of intensity on the order of $10^9$ to $10^{17}$ watts/cm$^2$. The present invention utilizes one or more laser pulses having selected pulse width, repetition rate, wavelength and intensity of the laser beam at the plasma-forming material, to form a plasma of the material. Under certain circumstances, continuous laser beams are also thought to be useful for the above purposes. Such continuous wave (CW) lasers are preferably operated in a range of 10 microns to 200 nanometer wavelength and average energy in the range of joules to hundreds of joules.

The material containing the isotopes desired to be separated is placed in the beam path and is called a target. A plasma is formed from the target material by focusing or otherwise delivering an intense, optical pulse from the laser onto the target. The concentrated energy contained in the focused laser beam is absorbed by the target material, energizing its electrons and raising it to a temperature or other form of excited state whereby ions are produced thereby generating a plasma. The extent of material affected by the laser pulse is dependent upon a number of factors including pulse duration, energy, and wavelength.

The invention provides a method and system apparatus, including laser, for producing ions having varying isotopic, ion energy and charge state distributions. In one aspect, the ions are contained in a plasma plume generated when one or more laser pulses are directed to a target. In another aspect, the ions are collected on a substrate in a manner which provides zones having isotopic distribution different from that which naturally occurs for a given element contained in the target. It is preferred that the pulses which generate the plume be produced by an ultrafast laser (femtosecond or picosecond) which generates the plume by ablation or laser induced breakdown (LIB) of the target material. Such ultrafast pulses, however, are not thought to be the only way to optimize the process.

Thus, the process and system of the invention produce an unusual isotopic enhancement effect in the observed ion spectra. This effect is manifested as an enrichment of the lighter isotope in zones of the ablation plume, as observed normal to the surface of the target material. The relative intensity of this effect was observed to vary with the charge-state and energy of the ions.

Generation and Analysis of the Plume

The process of the invention has been utilized to produce boron and gallium isotopes in respective ablation plumes coming from boron nitride and gallium nitride solid target. The plume was generated in a system as schematically shown in the diagram of FIG. 1. As shown in FIG. 1, a laser beam was supplied to the deposition chamber which contained the target. In the experiments described herein, the laser beam was generated-by one of two types of laser systems. One was an ultrafast Ti:Sapphire-based laser system developed at the Center for Ultrafast Optical Science (CUOS) for the femtosecond and picosecond data sets. The other one was a commercial Nd:YAG Laser for the nanosecond data set.

Nominally, the ultrafast laser system produces 100 femtosecond amplified laser pulses at 10 Hertz and a wavelength of 780 nanometers. The pulse energy can be as high as 100 millijoules and with a peak-to-background contrast as high as $10^8$. The laser system consists of a number of components and utilizes chirped-pulse amplification (CPA). CPA avoids damage in amplifier media by reducing the peak intensity during amplification. The ultrashort pulse is stretched in time by chirping the pulse, that is, giving the pulse a time-varying wavelength. The stretched pulse is amplified and then recompressed to give an amplified, ultrashort pulse.

The oscillator is a commercial Ti:Sapphire system from Clark-MXR, Inc. which is pumped by a CW (continuous-wave) Argon laser, also commercial. The mode-locked oscillator produces 50-femtosecond pulses at 100 MegaHertz with a pulse energy of 2 nanojoules. The bandwidth and center wavelength are tunable and are nominally 15 nanometers and 780 nanometers, respectively. A Pockels cell is used to reduce the repetition rate to 10 Hertz which is the (nominal) maximum rate this particular system can handle due to thermal effects.

The oscillator pulse is stretched in time to 230 picoseconds by a grating-based stretcher. The efficiency of the stretcher is 50% and its output is a 1- nanojoule, 230-picosecond pulse. The amplification chain consists of three amplifiers. (1) The regenerative amplifier is a Ti:Sapphire laser cavity pumped by 5 millijoules of the doubled frequency of a Nd:YAG laser (532 nanometers). It can amplify the pulse nominally from 1 nanojoule to 1 millijoule. (2) The two-pass amplifier is a Ti:Sapphire crystal pumped by 120 millijoules of the same Nd:YAG laser used for the regenerative amplifier. Two passes in this crystal amplifies the pulse from 1 millijoule to 20 millijoules. (3) The four-pass amplifier is a Ti:Sapphire crystal pumped by two high-power Nd:YAG lasers (at a doubled frequency of 532 nanometers). The total pump energy is 1.2 joules and can amplify the pulse from 20 millijoules to 200 millijoules. The pulse is then recompressed by a grating pair to a nominal pulse width of 100 femtoseconds. The compressor is in a vacuum chamber to avoid self-phase modulation and other nonlinear effects of the high-intensity pulse in air. The compressor has an efficiency of 50% and outputs 100-femtosecond, 100-millijoule pulses. Background concerning CPA laser systems and lasing using short optical pulse can be found in U.S. Pat. Nos. 5,235,606 and 5,656,186, incorporated herein by reference in their entirety.

In the experiments described here, two outputs of the above-described laser system were used: (1) the ultrashort pulse which is 780 nanometers and has a duration of 150 or 200 femtoseconds; and (2) the stretched, amplified pulse which is 780 nanometers and has a duration of 230 picoseconds.

The nanosecond laser used in this research is a Continuum Surelite I Nd:YAG laser which has a nominal pulse width of 6 nanoseconds at a wavelength of 1.06 microns and a pulse energy of 450 millijoules.

For the experiments, the beam had pulse widths in the nanosecond (ns) to femtosecond (fs) range, repetition rate on the order of 10 Hz, intensity in the range of $10^{10}$ to $10^{15}$ watts per square centimeter (w/cm$^2$), and wavelength on the order of one micron. The laser beam was focused and directed to the target through a lens.

The laser pulse was directed at the target at an angle to the target of approximately 45 degrees. The laser beam ablated the target material and generated a plume. The specific angle of laser impingement on the target is not thought to be critical. However, it is important to note that the ablation plume leaves the surface of the material in a direction that is essentially normal to the surface, that is, at a 90 degree angle to the surface. The target could be any material including amorphous or crystalline solids, liquids or gases including high density plasma/gas state. The examples described herein were solids.

The center of the plume was directed toward a set of apertures that acted as collimating devices and introduced the ions into the ion energy analyzer. This analyzer was a conventional curved (spherical) sector plate electrostatic energy analyzer. When it was operated in a time of flight mode, through synchronization with the laser pulse, the analyzer was also capable of uniquely separating ion charge states. Discrete energy distributions of the individual charge states for ions in the ablation plume were obtained by sweeping the analyzing voltage on the sector plates and using time of flight synchronization.

Monitoring Ion Charge, Energy and Distribution of Charge and Energy

The energies and charge-states in the ablation. plume reported herein were measured using a spherical-sector electrostatic energy analyzer. The ions entered the analyzer and passed between two curved spherical-sector plates. A voltage up to 5000 volts was placed on each of the plates. An ion passing between the plates is influenced by this voltage which curves the path of the ion. The magnitude of this force depends on the voltage on the plates and on the charge-state and energy of the ion. Specifically, for a certain voltage difference on the plates, only ions with a certain energy-to-charge ratio will follow the path and reach the detector (the MCPs). In the geometry of this analyzer, the energy-to-charge ratio (E/q) of the selected ions is equal to 2.254 times the voltage difference ($V_{diff}$) between the spherical-sector plates which gives the equation: $(E/q)_{selected}=2.254 \times V_{diff}$ where E/q is in units of electron volts (eV), and $V_{diff}$ is in volts (V). For positive ions, a negative voltage was placed on the inner plate and a positive voltage on the outer plate.

A specific voltage difference between the plates gives ions with a particular energy-to-charge ratio. The detector will observe a charge state 1 ion with a specific energy E as determined by the sector plate voltage and will also observe a charge state 2 ion at an energy of 2E. However, ions with differing charge-states are detected at differing times after the laser pulse. This follows since an ion with twice the charge-state and twice the energy travels at a faster speed, that is, 1.414 times faster because energy is related to the square of the speed. Thus, the higher-energy ion arrives earlier. This technique which used the arrival time after the laser pulse, to analyze the detected signal, is called spectral time-of-flight analysis.

In order to obtain the entire distribution of ions over energy and charge-state, the voltage difference on the sector plates was scanned from 0 to 10,000 volts. Each voltage difference gave a set of charge-states and energies as described above. A computer program is used to select the individual charge-states at each sector plate voltage difference and to assemble the ion energy and charge-state distributions. These distributions of ion energies and charge-states depend on the parameters of the laser pulses as defined herein. The isotope enrichment process was observed both in the ion distributions of the plume and in the spatial patterns, from the deposition and growth process, on the thin films.

Figure 2:
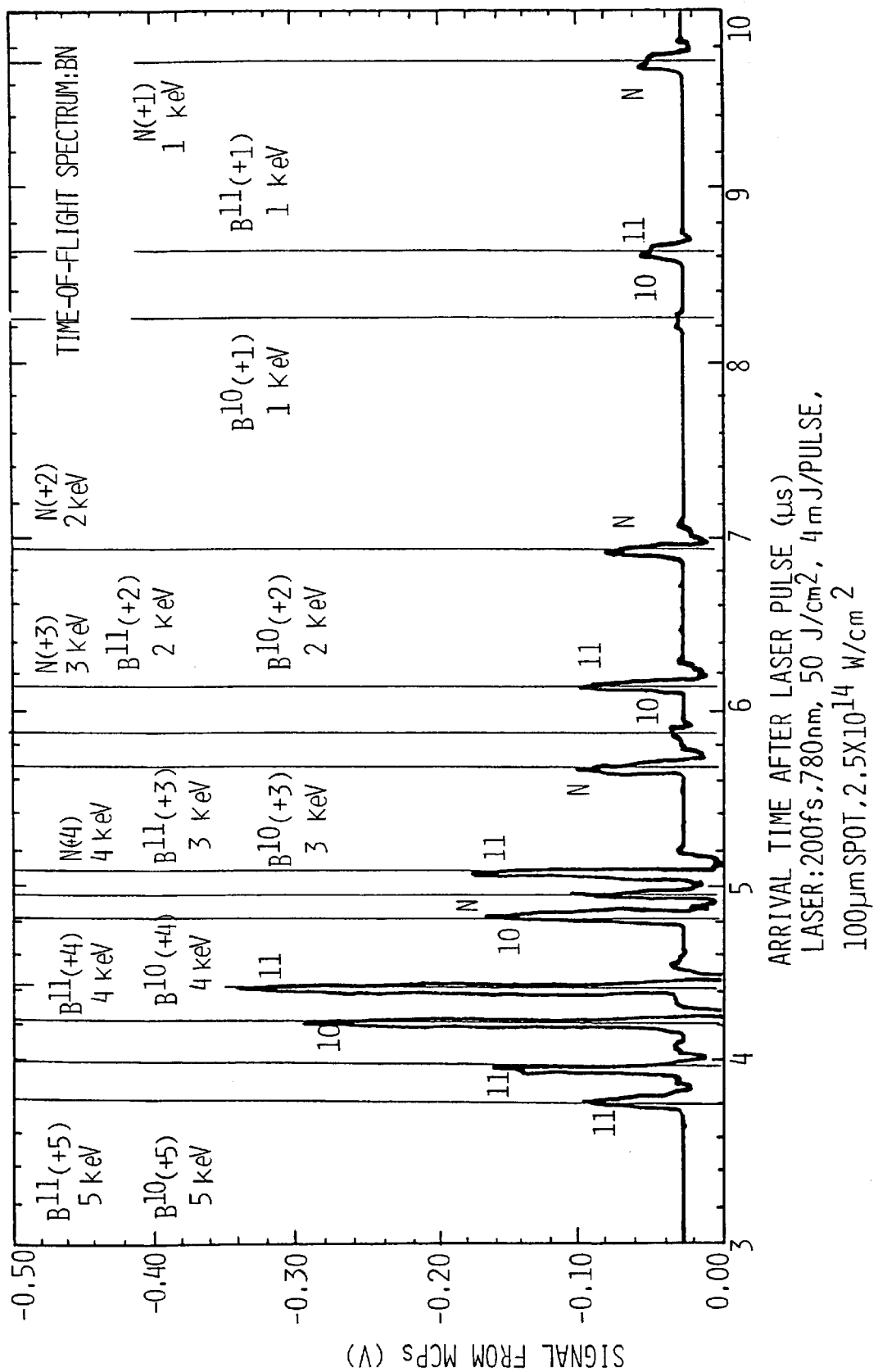
FIG. 2 is a graph showing the signal from the microchannel plate (MCP) of the ion energy analyzer in units of voltage as a function of arrival time after the laser pulse in microseconds.

A typical spectrum is shown in FIG. 2 for boron nitride where the boron isotopes are shown along with the nitrogen ions. For the case of a boron nitride target, the two stable isotopes, boron 10 and boron 11, were easily observed. Their natural abundance is 19.78% and 80.22%, respectively. Relative isotopic ratios in the ablated plume are observable in these spectra as a function of ion charge state and ion energy.

FIG. 2 shows data obtained at a fixed voltage on the sector plates and using time of flight synchronization to build up discrete energy spectra of the individual charge states for ions in the ablation plume. Here, the signal from the MCP (micro channel plates) of the detector was plotted as the function of arrival time after the laser pulse shown in microseconds. This data was obtained under vacuum conditions. This data was obtained using pulse width of 200 femtoseconds, wavelength of 780 nanometers, repetition rate of 10 Hz, and 4 millijoules (mJ) energy per pulse using the Ti:Sapphire laser. The data of FIG. 2 was captured in a vacuum by the experimental apparatus shown in FIG. 1. The intensity of the laser beam incident on the target was about $2.5 \times 10^{14}$ watts per square centimeter.

Referring to FIG. 2 and bearing in mind that the natural abundance ratio of boron 10 to 11 is on the order of 20:80, it can be seen that enrichment of a specific isotopic species within a zone of the plume is achieved. More specifically, FIG. 2 shows boron 10 B(10) and boron 11 B(11) at the +4 charge condition captured approximately 4 microseconds after the laser pulse. Here, the occurrence of B(10) and B(11) is about the same. In other words, at the +4 charge condition corresponding to 4 keV, the number of B(10) isotopes, as shown by the B(10) peak, is approximately the same as the number of B(11) isotopes. This distribution of B(10) and B(11) at the +4 charge state shows an occurrence of B(10) that is 4 times more than its naturally occurring abundance with respect to B(11). Therefore, there was clearly a zone within the plume that contained an enriched fraction of B(10) with respect to B(11) as compared to the naturally occurring amount. The distribution captured for B(10) and B(11) in the +1 charge state at about 1 keV, is shown in the vicinity of 8–9 microseconds after arrival of the laser pulse. In the graph at close to 9 microseconds, there is shown a peak for B(11) and close to 8 microseconds, there is shown a peak for B(10). The relative proportion of B(10) to B(11) at this segment shows that there is more B(10) relative to B(11) than the naturally occurring amount. This is even more clearly seen in FIG. 3A, where the ratio of B(11):B(10) is always less than 4:1 and often at about 1.5:1. The naturally occurring amount of B(11) to B(10) is 4 to 1 (80:20). This enrichment at essentially all charge states +1 to +5 occurred because the aperture permitted passage of the rich B(10) part of the plume to the detector. Correspondingly, B(10) lean parts of the plume did not reach the detector. Since isotopic species were not created or destroyed in the process, it follows that there are probably zones within the plume or remaining target material which are relatively deficient in B(10) and relatively enriched in B(11).

Figure 3A:
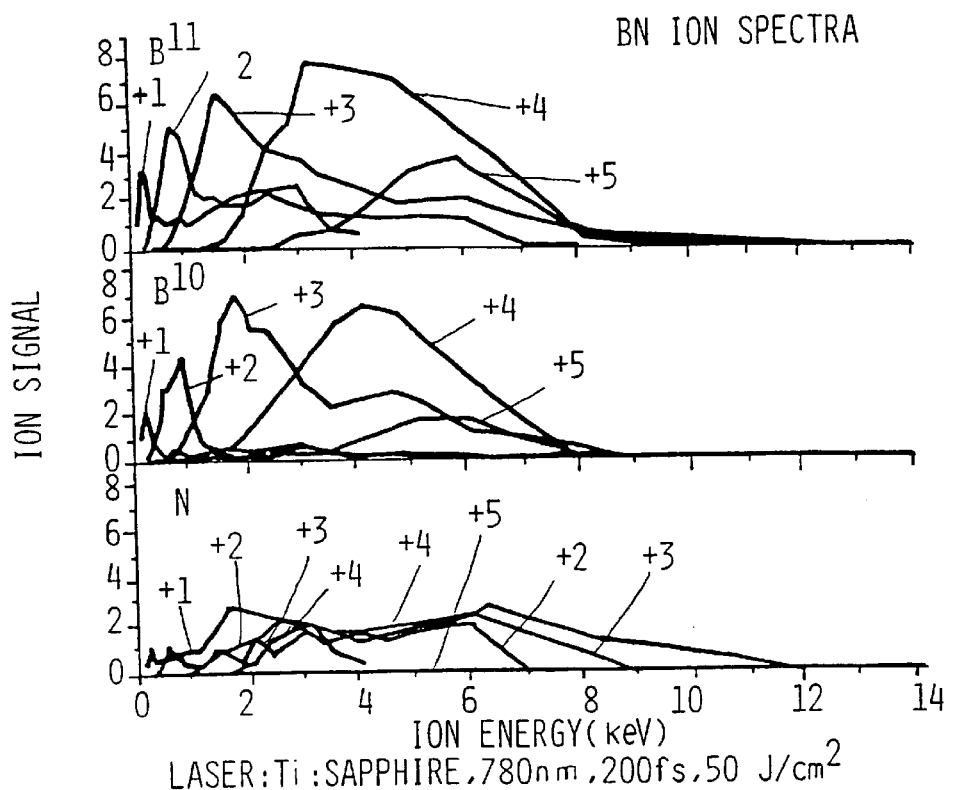
FIG. 3A shows data obtained in the experimental-apparatus of FIG. 1 where the deposition chamber was under vacuum.
Figure 3B:
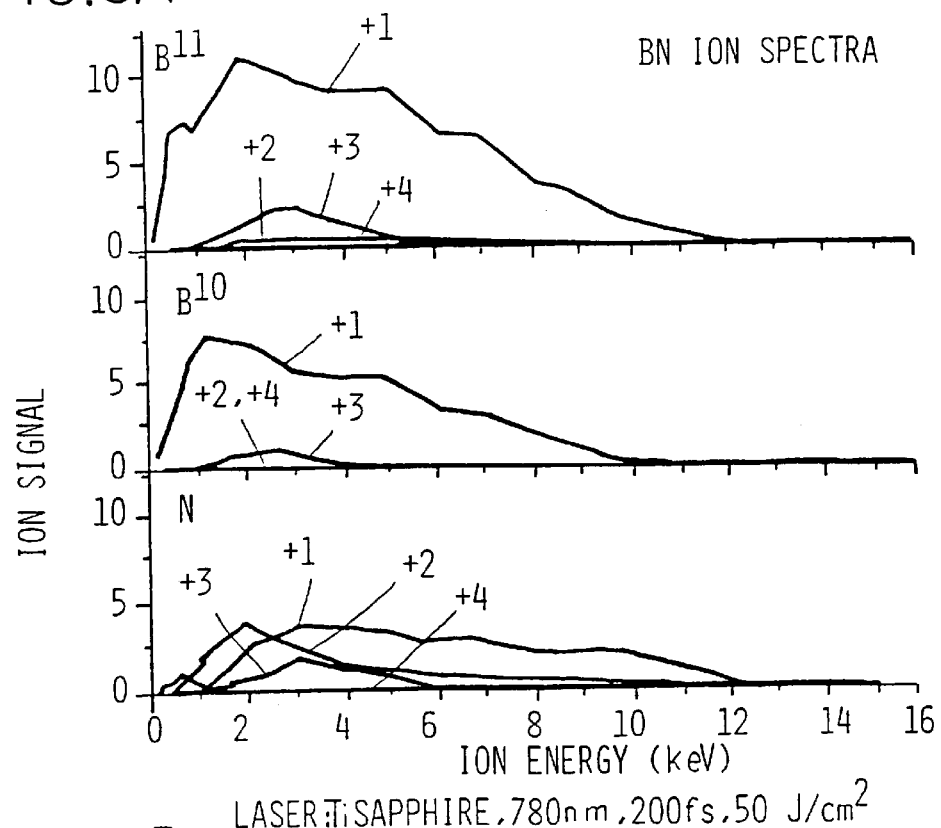
FIG. 3B shows data obtained in the same experimental configuration and under the same conditions except that nitrogen gas was included in the chamber.

The data of FIG. 3 was obtained by sweeping the voltage on the analyzed sector plates, the charge and energy distribution data for boron as shown in FIG. 2 was integrated to produce FIG. 3A. FIG. 3 also shows data for equivalent experimental conditions where a deposition chamber included nitrogen gas backfill of 0.8 m Torr (FIG. 3B). There are 3 sets of data in FIGS. 3A and 3B, respectively, showing B(11), B(10) and N (nitrogen). The nitrogen curves are significantly smaller in amplitude than the boron curves due to the depletion of N in the BN target from heating and ablation over time.

FIG. 3A shows the ion energy distributions resulting from successive spectra as obtained per FIG. 2. In FIG. 3A the peak of the +1 ion energy distribution is to the extreme left followed by +2, +3, +4, and +5. B(11) is the top plot and B(10) the middle plot. Peaks from nitrogen are also given as the bottom plot of FIG. 3A, but are not being used to demonstrate the effect in this figure. It is anticipated that the very small concentrations of nitrogen isotopes, not desirable here, are likewise undergoing enrichment. These nitrogen peaks exist because the starting material is boron nitride and nitrogen ions were generated as well as boron ions. More specifically, FIG. 3A shows a plot of transverse ion density expressed in ions/cm$^2$ versus ion energy expressed in keV. FIG. 3A was obtained by sweeping the sector voltages on the analyzer plates resulting in the energy distributions as a function of the charge state. As can be seen from FIG. 3A, the geometry of the experiment of FIG. 1, caused capture and detection of the zone within the laser ablation plumes where the relative ratio of these isotopes (B(10) and B(11)) are drastically altered from their naturally occurring abundance, when measured as a function of charge state and energy. That is, in all cases, the ratio of B(10):B(11) was greater than that which naturally occurs, and often close to 50:50.

The results demonstrated in FIGS. 2 and 3A were also obtained when generating a plume in the deposition chamber in the presence of a background gas of nitrogen. When the chamber contained nitrogen gas, there was a charge exchange which occurred as the boron ions gathered electrons from the nitrogen. Here, the boron ions were reduced from the higher charge states such as +3, +4 and +5 and to the lower charge states, namely, +1 and +2. This is evident from FIG. 3B. Here, enhancement was also clearly obtainable since the ratio of B(10) to B(11) was on the order of 50:50.

It is thought that the presence of the background gas facilitates formation of a product film containing constituents derived from the background gas and this may be desirable in forming isotope enriched zones having a particular chemical composition. It is clearly advantageous that the presence of a background constituent does not affect the process of enrichment yet permits inclusion of background gas species in a product. Therefore, by this means, materials of desired composition may be formed having the isotope enriched feature. This is demonstrated later with respect to formation of a film from the plume. It is anticipated that isotopically enriched particulates, precipitated from the plume or background gas, could also be formed. This would provide a mechanism for creating isotopically enriched nano-particles.

FIG. 4 contains results obtained from the experimental apparatus of FIG. 1 but with a different laser beam. Here, laser wavelength of 1.06 microns was used; repetition rate of 10 Hz was used; and a pulse width of 6 nanoseconds was used. The pulse energy was 60 millijoules (mJ) energy per pulse corresponding to a fluence of 760 J/cm$^2$ and an intensity of $1.3 \times 10^{11}$ w/cm$^2$. Here, the main difference in the method was the use of significantly different pulse width, namely, 6 nanoseconds as compared to the prior 200 femtoseconds. The experiment was conducted both in a vacuum and in the presence of nitrogen background gas.

The experimental set up used to obtain data of FIG. 4 included the directing of the plume through an aperture as shown in FIG. 1. Therefore, the data of FIG. 4 also shows capture and detection of the B(10) enriched central portion (cone) of the plume.

Figure 4A:
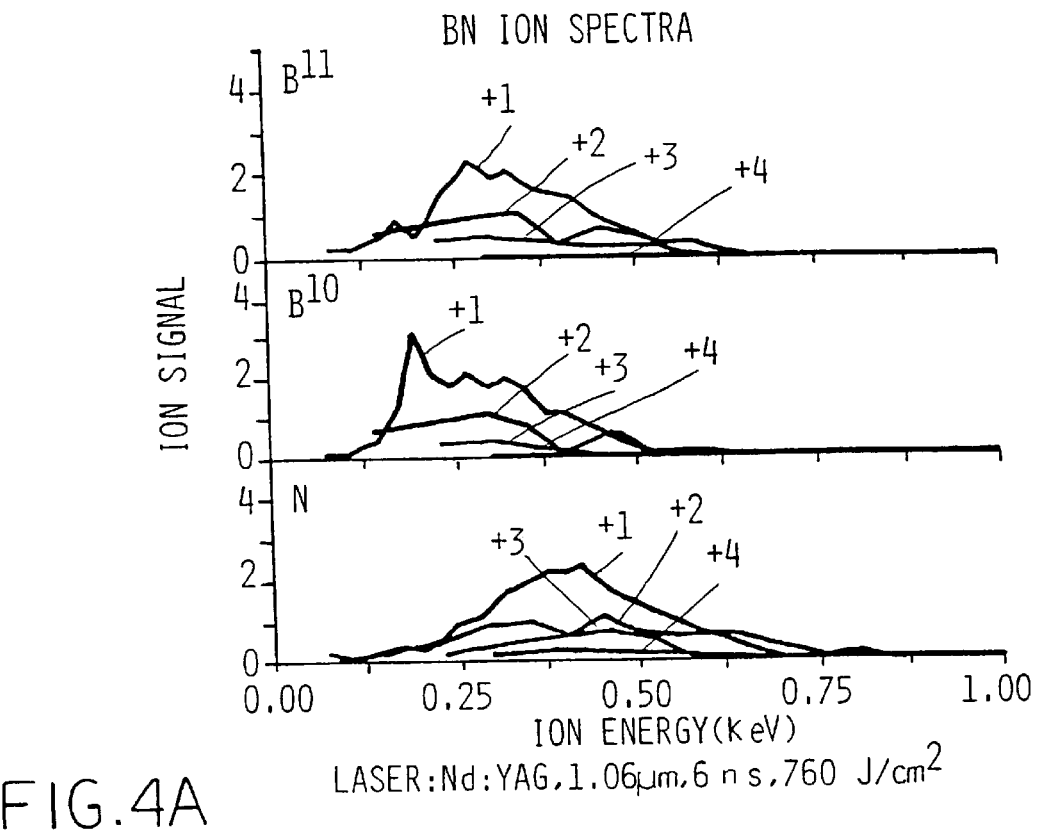
FIG. 4 contains two plots labeled as 4A and 4B. The data of FIG. 4 was obtained by ablation of boron nitride target at 6 nanoseconds pulse width, 1.06 micron wavelength, 60 millijoule energy per pulse, corresponding to an energy fluence of 760 J/cm² based on 100 micron spot size.
Figure 4B:
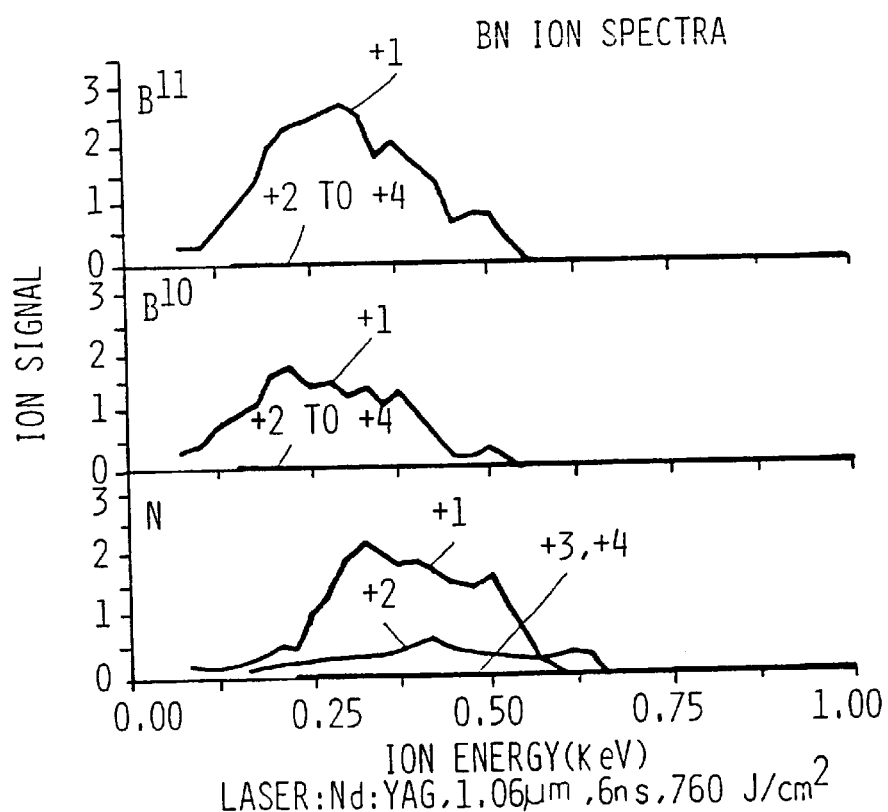

FIG. 4 shows transverse ion density of the plume captured in the enriched zone as a function of energy level. The results shown in FIG. 4 are both for the case of the vacuum and the case where nitrogen background gas is contained in the deposition chamber. It is observed that generally the transverse boron ion density in the 6 nanosecond case is less than the 200 femtosecond case. In other words, there is less dense plasma plume generated under the laser operating parameters defined here at 6 nanoseconds pulse width. Relative enrichment is still obtainable. In other words, there is enrichment of B(10) with respect to B(11) as compared to that which is naturally occurring. The overwhelming conclusion to be drawn from the data is that enrichment has clearly occurred. The effect of $N_2$ background gas in FIG. 4B was similar to that observed in FIG. 3B. Therefore, the overall conclusion to be drawn from the data presented in FIGS. 2, 3, and 4 is that the relative ratio of the isotopes, in these ablation plumes, are drastically different from that observed for the naturally occurring species as reported in standard references. More specifically, the experimental set-up shown in FIG. 1 contains the apertures having four millimeter (mm) holes. The aperture guided the plume into the detector and also acted as a way of isolating the high pressure zone of the chamber from the low pressure (vacuum) zone. Since the plume was generated in a vacuum chamber, apertures help in maintaining the relative vacuum. As a consequence of this set-up, the aperture essentially permitted passage through of that portion of the plume which contained the relatively high proportion of B(10) as compared to B(11). Therefore, all of the data shown in FIGS. 2, 3, and 4 show a relatively enriched B(10) portion of the plume.

Figure 5A:
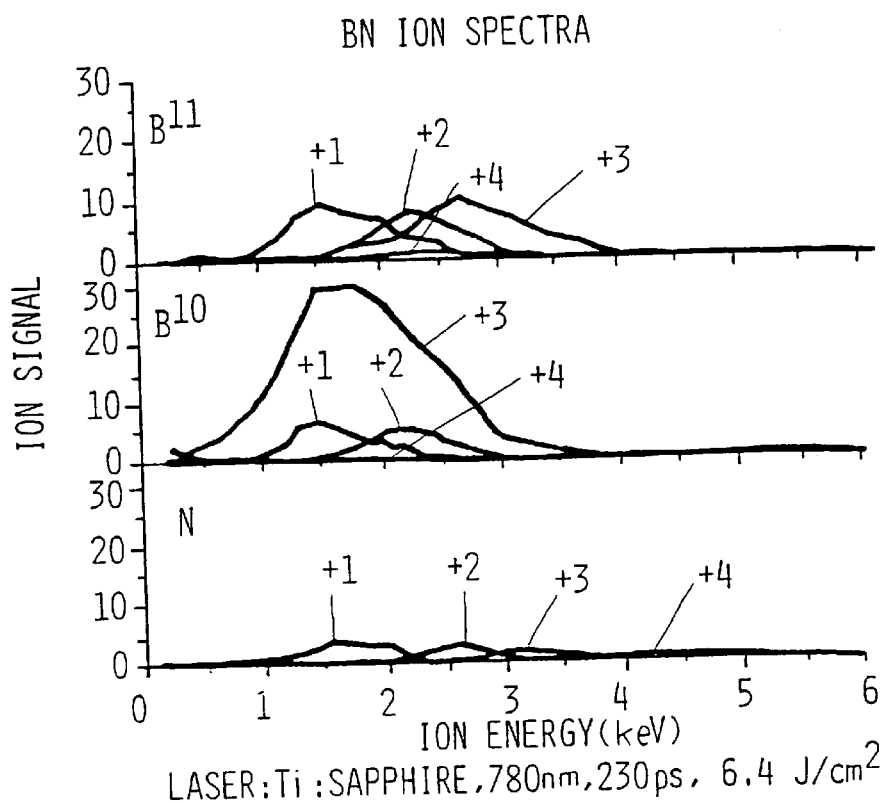
FIG. 5 contains two plots labeled as 5A and 5B. The data of FIG. 5 was obtained by ablation of boron nitride target at 230 picoseconds pulse width, 780 nanometers wavelength and 6.4 J/cm² energy fluence.
Figure 5B:
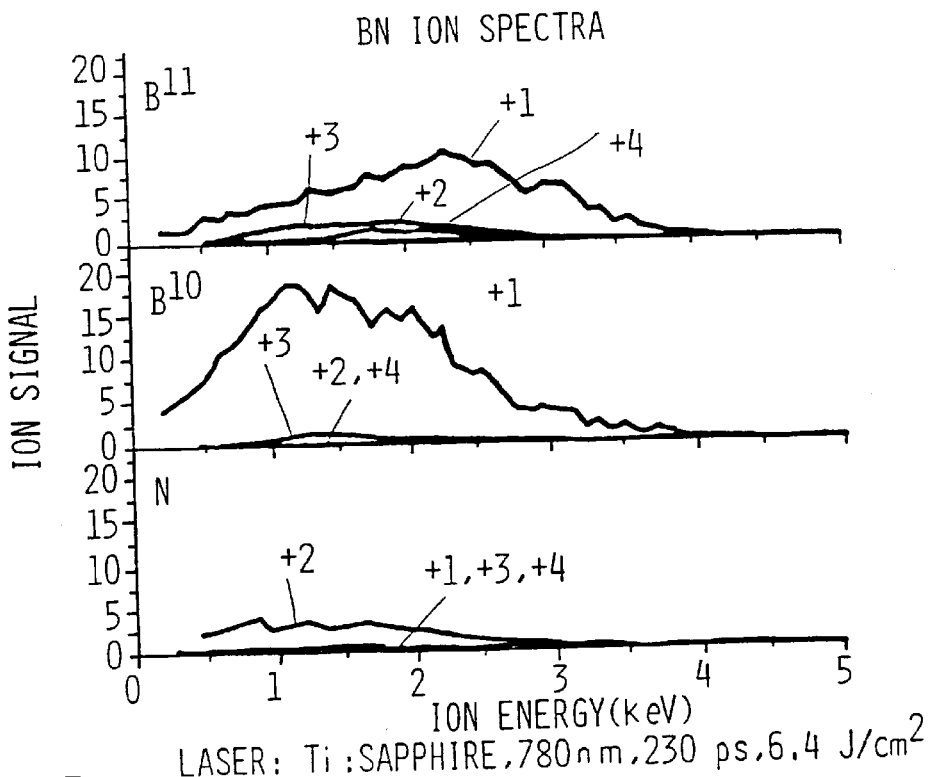

FIGS. 5A and 5B show the isotope enhancement effect for a picosecond laser pulse. The energy and charge state distribution of the ions are shown from a BN plume. The plume was generated with a 780 nanometer, 230 picosecond laser pulse with an intensity of $2.8 \times 10^{14}$ Watts/cm$^2$. FIG. 5A is for a plume in vacuum, and FIG. 5B is for the same plume in a background of 0.8 milliTorr of N2 gas. Charge state +3 in the vacuum case and charge state +1 in the N2 case show a very strong enhancement of B(10) over B(11). This demonstrates the dependence of the isotope effect on ion charge state and ion energy.

Figure 6A:
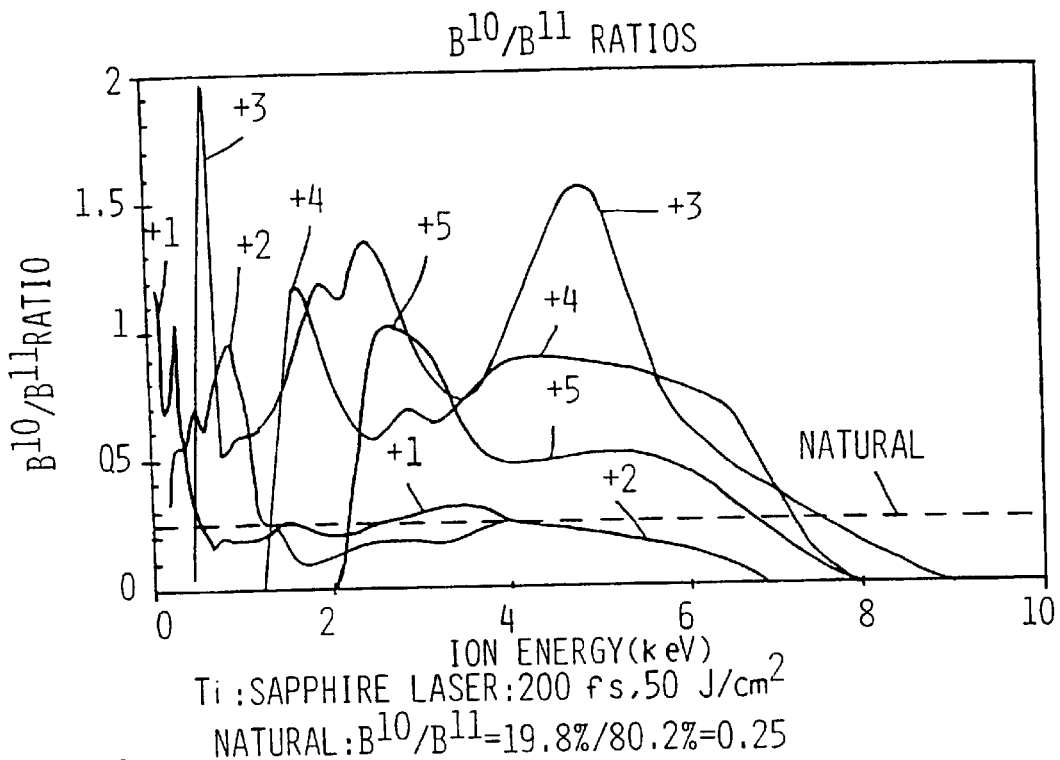
FIG. 6 shows plots of the ratio of $B^{10}/B^{11}$ for the data as respectively shown in FIGS. 6A (femtosecond case as per 3A), 6B (picosecond case as per 5A) and 6C (nanosecond case as per 4A).
Figure 6B:
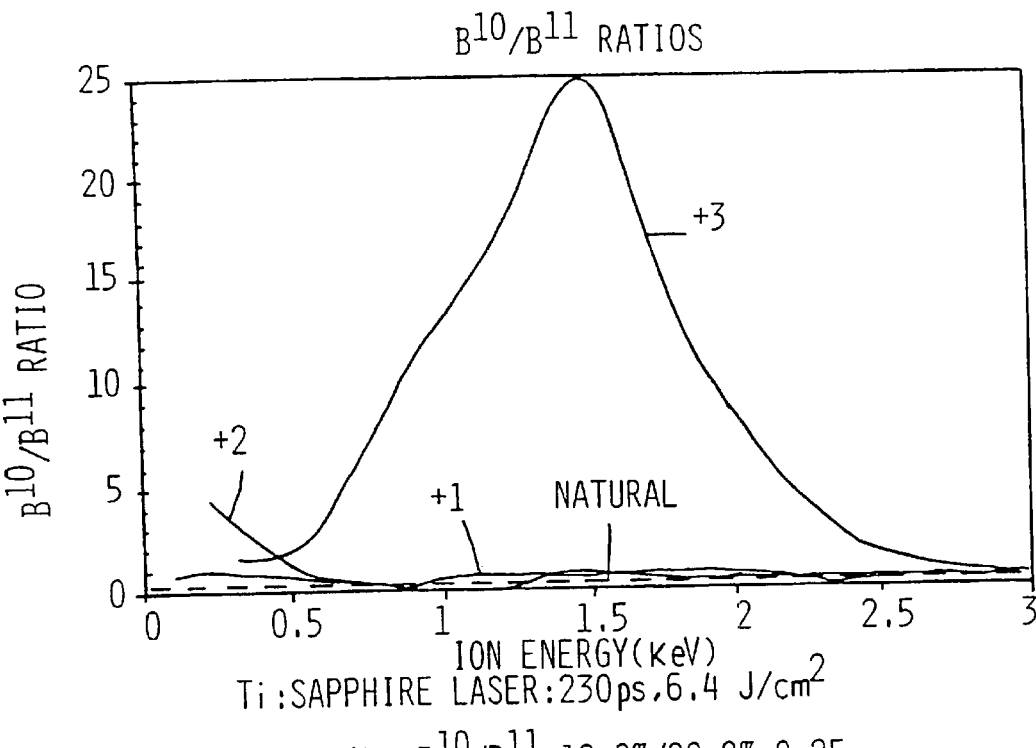
Figure 6C:
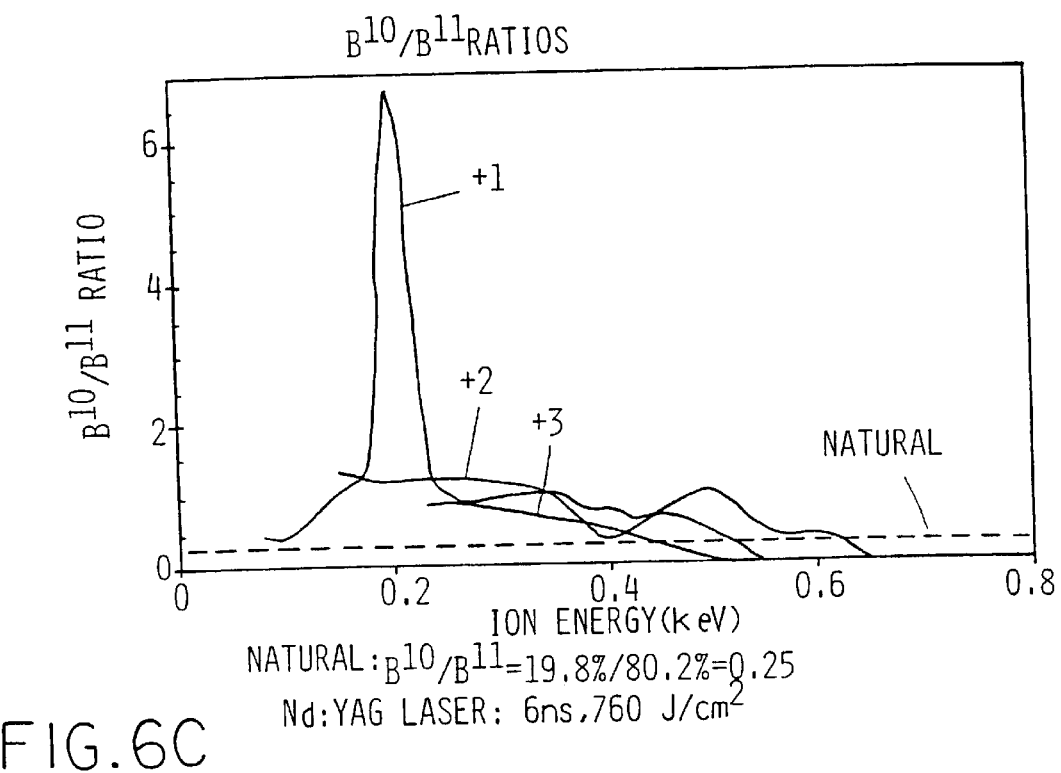

The dependence of the isotope enhancement on ion charge state, ion energy and laser pulse duration is summarized in FIG. 6. The calculation of the B(10) to B(11) ratio for the data from FIGS. 3A, 5A, and 4A is shown in FIGS. 6A–C, respectively. The naturally occurring ratio is 0.25 and is shown as the dotted line in each graph. The femtosecond case in FIG. 6A shows a strong enhancement of B(10) over B(11) for charge states +1 to +5, particularly for +3, +4, and +5. The enhancement is present for nearly the entire range of the ion energies.

Figure 7:
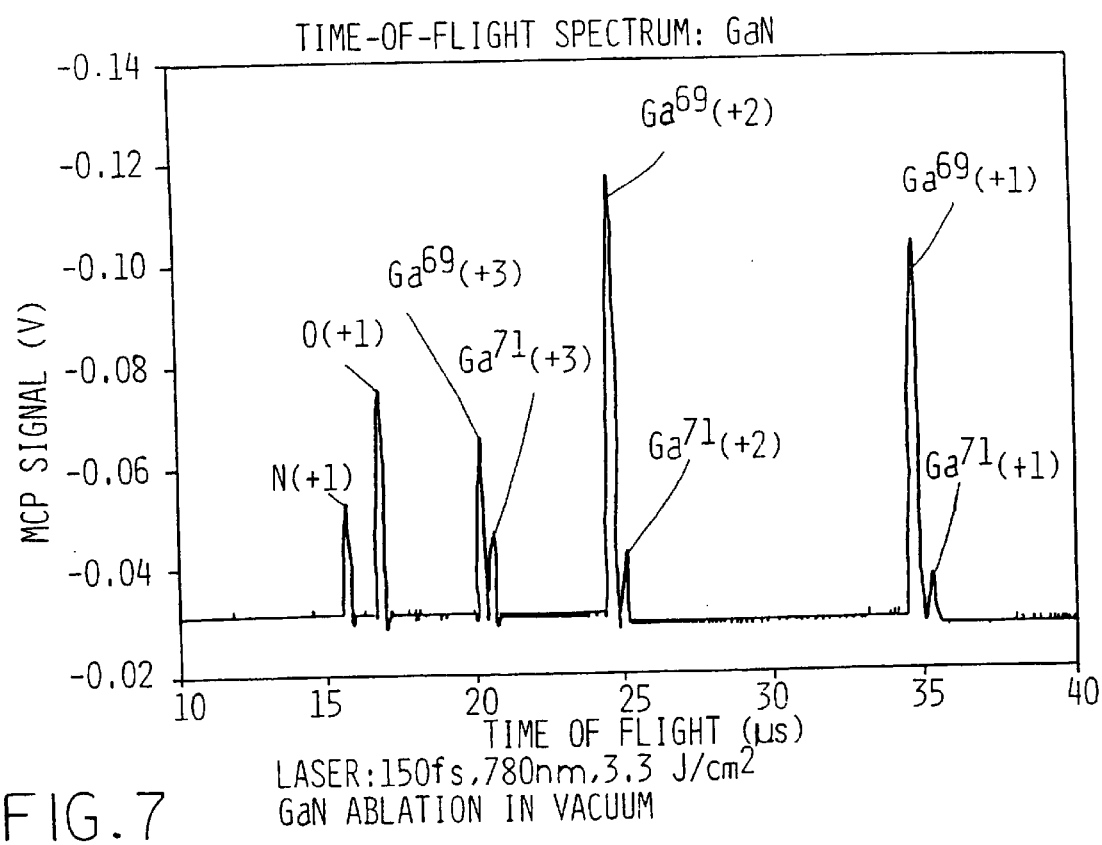
FIG. 7 is a graph showing the signal from the microchannel plate (MCP) of the ion energy analyzer in units of voltage as a function of arrival time after the laser pulse in microseconds.

The isotope enhancement was also measured for gallium which has naturally-occurring isotopes with masses of 69 and 71 amu with an abundance of 60.4% Ga69 and 39.6% Ga71. Enrichment of the lighter isotope was also observed for this material using the experimental set-up of FIG. 1 in the same manner as for boron nitride. The time-of-flight spectrum from a GaN (gallium nitride) ablation plume in vacuum is shown in FIG. 7. The laser pulse was 150 femtoseconds, 780 nanometers, and $2.2 \times 10^{13}$ Watts/cm$^2$. In charge states +1 to +3, Ga69 and Ga71are present, with ratios clearly greater than the naturally-occurring ratio of 1.53.

Figure 8A:
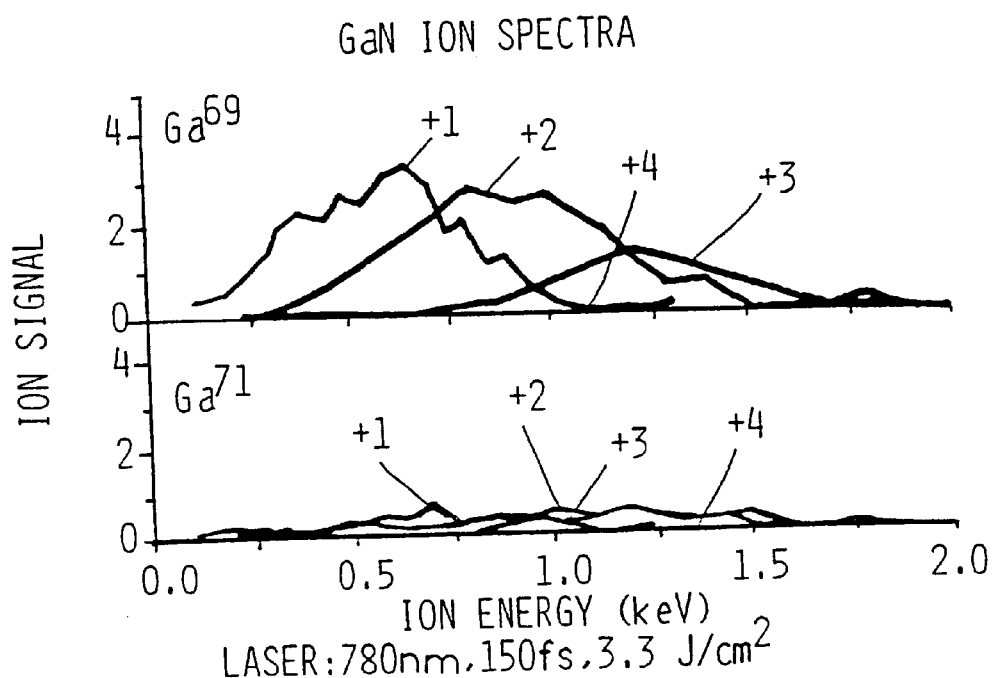
FIG. 8A shows data obtained in the experimental apparatus of FIG. 1 where the deposition chamber was under vacuum.
Figure 8B:
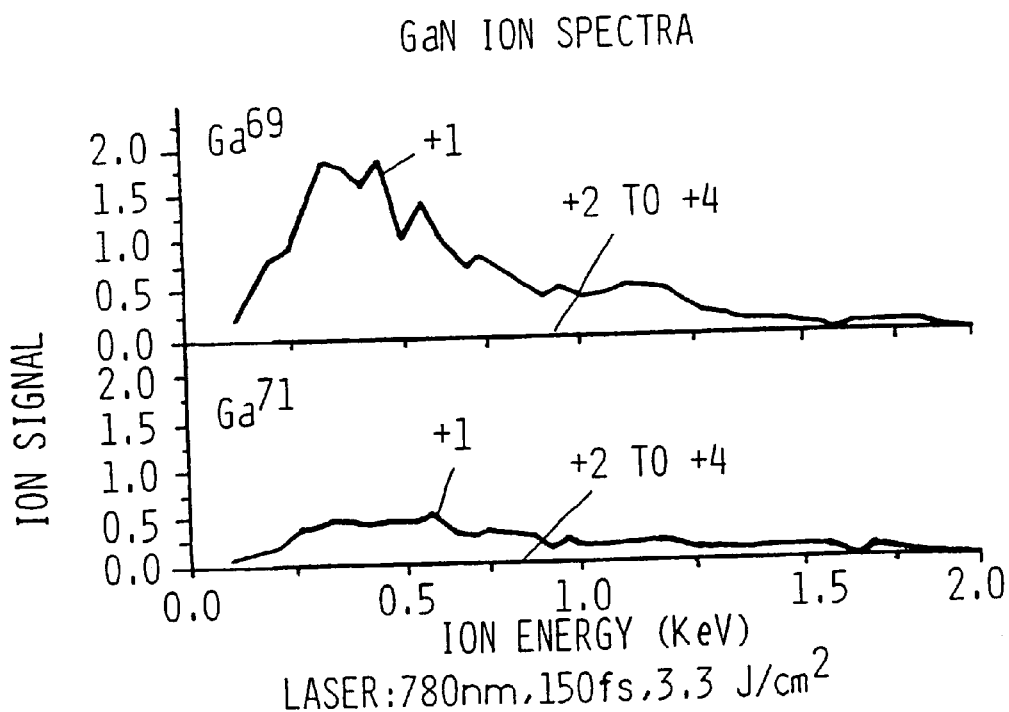
FIG. 8B shows data obtained in the same experimental configuration and under the same conditions except that nitrogen gas was included in the chamber.

The time-of-flight spectra are compiled in FIG. 8 for the same laser pulse described for FIG. 7. FIG. 8A shows the ion charge state and energy distribution in vacuum and FIG. 8B shows the case in 0.8 milliTorr N2 background gas. Once again, the enhancement of the lighter isotope, Ga69, over the heavier, Ga71, above the naturally-occurring abundance is clear for the different charge states and energies.

Figure 9A:
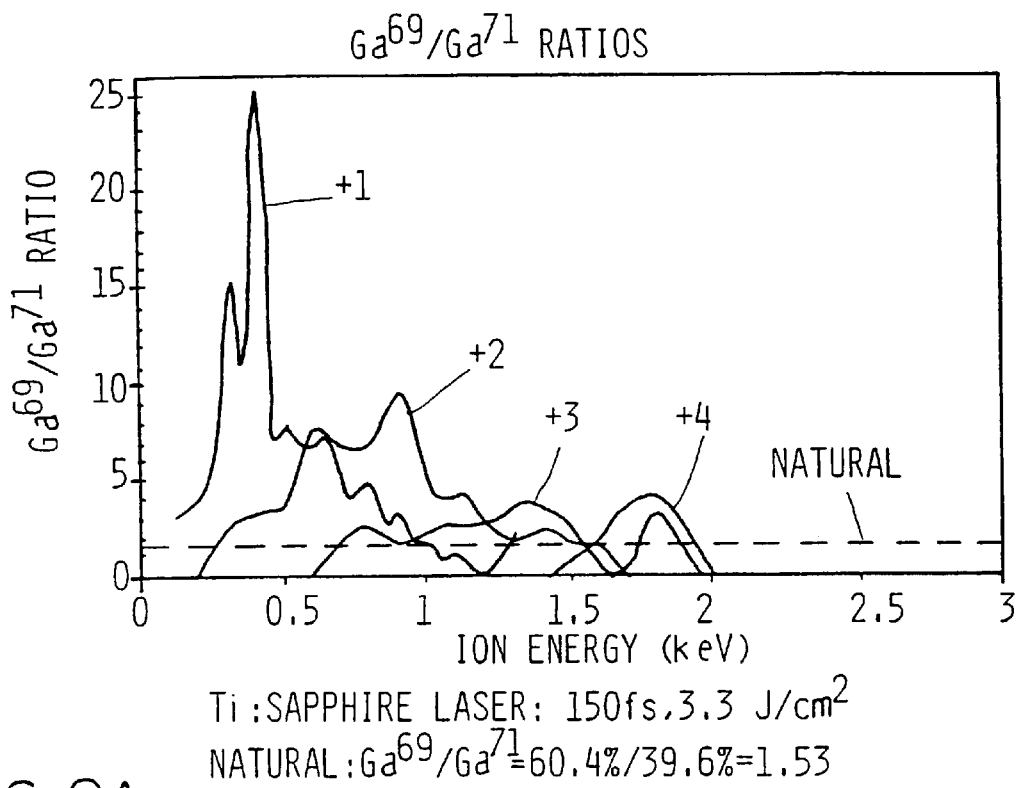
FIGS. 9A and 9B are at 150 femtoseconds, 3.3 J/cm² in vacuum and vacuum plus background nitrogen, respectively.
Figure 9B:
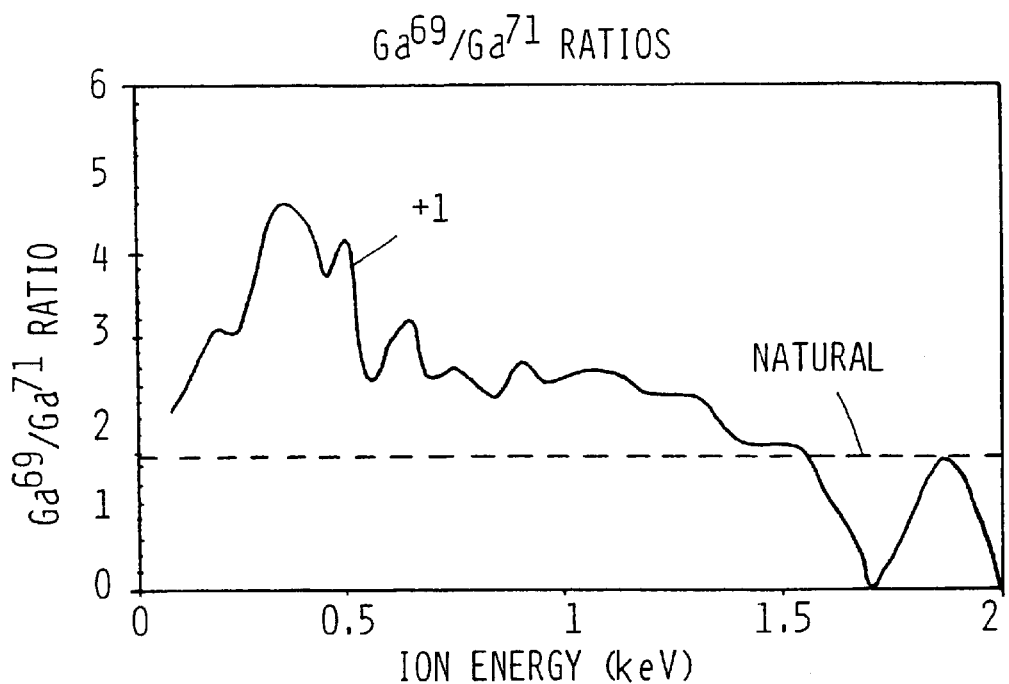
Figure 9C:
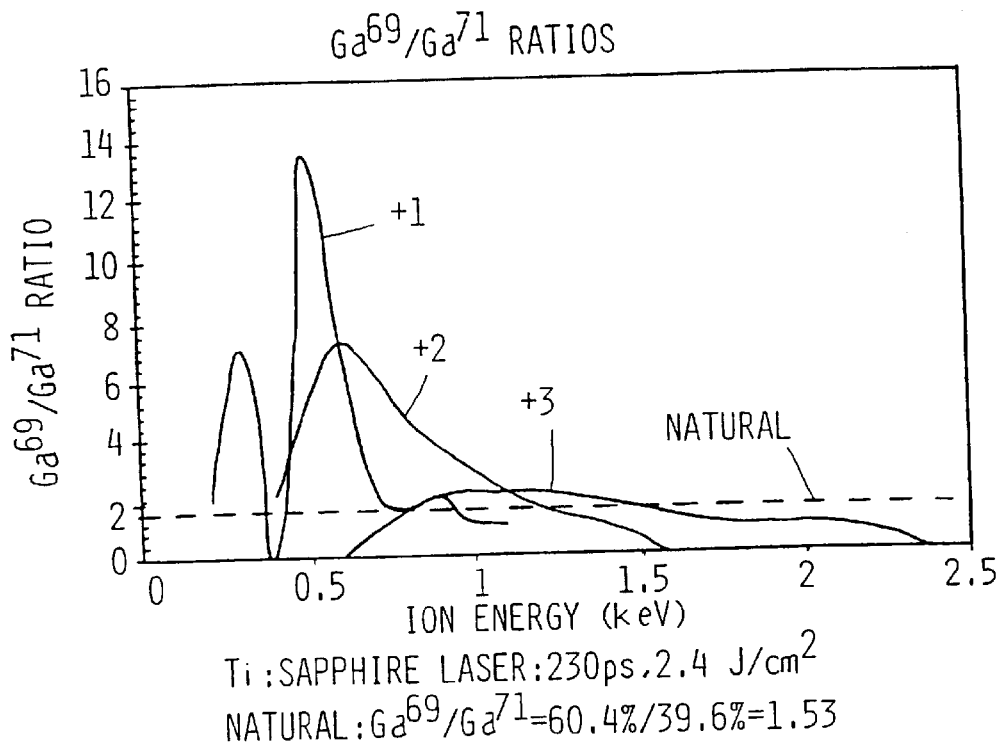
FIG. 9C is for vacuum at 230 picoseconds, 2.4 J/cm².

The isotope ratio for gallium is shown in FIG. 9 for three conditions. FIGS. 9A and 9B are for 150 femtosecond, 780 nanometer, 3.3 Joules/cm$^2$ laser ablation plumes. FIG. 9A shows the calculated Ga69 to Ga71ratio for the plume in vacuum, and FIG. 9B in a background gas of 0.8 milliTorr N2. FIG. 9C shows the ratio for a 230 picosecond, 780 nanometer, 2.4 Joules/cm$^2$ laser ablation plume in vacuum. The naturally occurring ratio 1.53 is shown as dotted lines in the figures. The enhancement of the lighter isotope, Ga69, over the heavier one, Ga71, follows the same trend as the boron case for B(10) and B(11). The effect is generally stronger here for gallium than that shown for boron in FIGS. 3–5.

Figure 10:
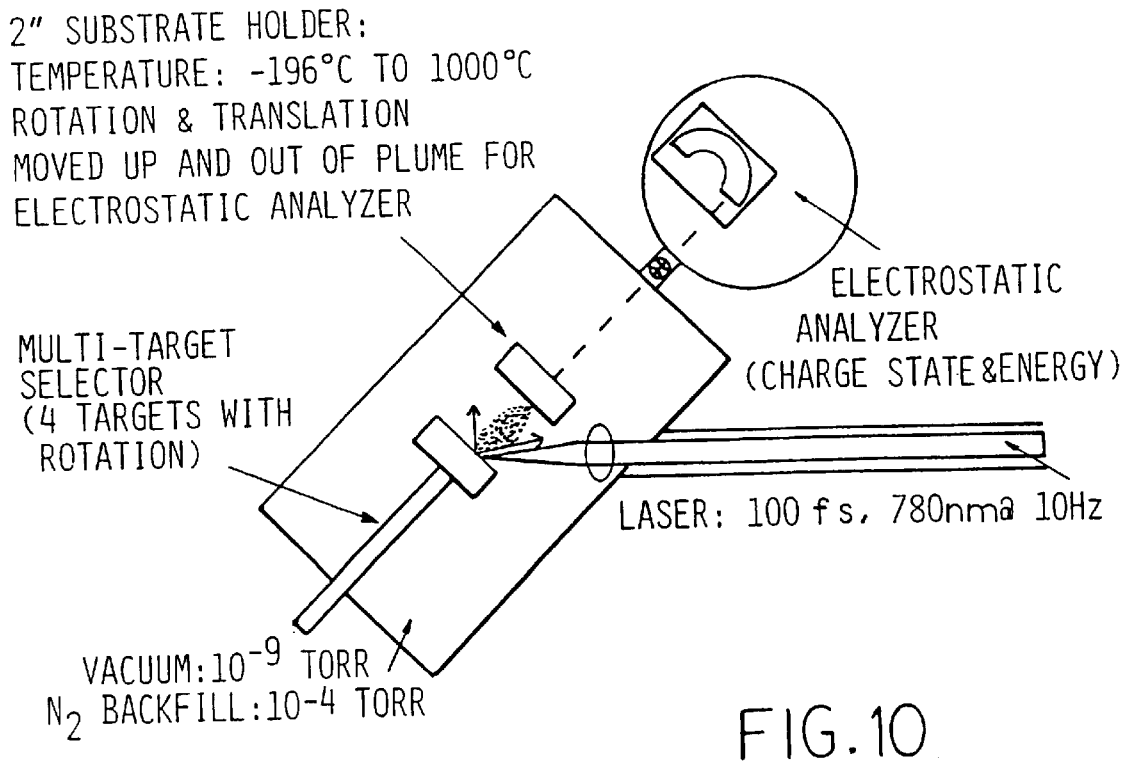
FIG. 10 is a schematic of a system for depositing a thin film from the ablation plume, containing activated, neutral, and ionized particles, onto a substrate. The configuration of FIG. 10 is similar to that of FIG. 1 except in FIG. 10 the aperture to the detector is blocked by the deposition substrate. As shown in the schematic, a laser beam from an external laser source enters the deposition chamber and impinges on a target, generates a plume, and the plume is deposited on a substrate holder.

The effect observed in the time of flight ablation plume coming from the ablated target is useful for preparing film products. This is accomplished by directing the plume toward a substrate in an experimental arrangement as shown in FIG. 10. As shown schematically in FIG. 11, the plume condenses to form a thin film on the surface of the substrate. The film was enriched in the preferential isotope ratios as observed earlier and as demonstrated by FIGS. 2–6. The following film experiments were designed to capture essentially the entire cross section of the plume. By this means, zones rich and lean in B(10) as compared to the natural abundance were clearly observed and verified.

Figure 11:
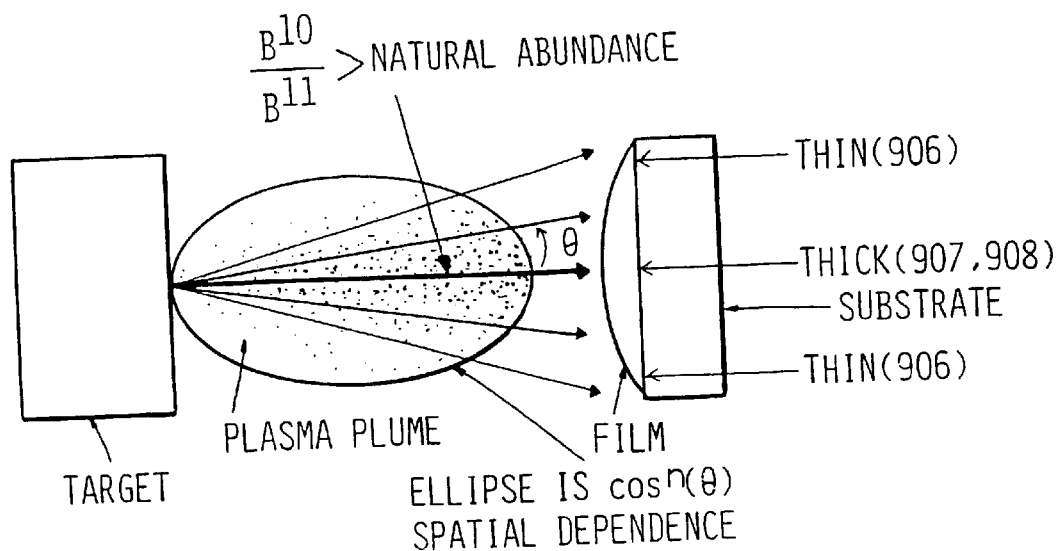
FIG. 11 shows a schematic illustration of a plume being emitted from a target and captured on a substrate. The figure shows that the plume has a $Cos^n(\theta)$ spatial distribution with the largest concentration directed normal to the target surface and a decreasing concentration away from normal. In the expression $Cos^n(\theta)$, $\theta$ is zero along the normal direction. The n represents a power function factor and theta represents the angle measured from the direction normal to the surface. With such a distribution, the plume deposits a graded concentration of material consisting of a thick portion of deposition on the central part of the substrate and a relatively thinner zone of deposition on outer (high $\theta$) regions of the substrate.

More specifically, it is believed that isotopes are neither created nor destroyed in the process, therefore, it is assumed that the composition of the plume or remaining affected target material, in total, represent natural occurrence of the B(10) and B(11) isotopes. This is further illustrated by reference to FIG. 11. FIG. 11 is a schematic showing the plume coming off of the target. The plume has a relatively B(10) enriched conical section (zone) and a relatively lesser B(10) zone on either side of the concentrated zone. These lesser concentration zones may be B(10) depleted. In order to further understand and verify the relative proportions of the isotopes in the entirety of the plume, films were formed in the deposition chamber in a manner which captured essentially the entire cross-section of the plume. This entire cross-section encompassed a relatively B(10)-rich central conical section as well as surrounding zones having relatively less B(10) or being B(10) depleted.

Film Production and Analysis

FIG. 10 shows an experimental set-up very much similar to the experimental set-up of FIG. 1 except that the plume generated from the target is directed to a substrate to form a film thereon. No apertures are used to screen out any portion of the plume or film. As shown in FIG. 10, the laser generates a pulse of 150–200 femtoseconds, 780 nanometers, and 10 Hz with an energy per pulse of 4 mJ–100 mJ. The laser beams are directed through a focusing device onto the target. In this example, the target is boron nitride. A plume of laser plasma is generated containing ionized particles of boron, nitrogen, and also electrons, some neutrals, and likely some excited atoms and molecules. The plume is directed onto a 2-inch diameter silicon substrate where the film is formed. Optionally, the substrate holder may be cooled by liquid nitrogen to a temperature on the order of 77° K if desired to affect the condensation and morphology of the formed film. Substrate temperatures elevated above room temperature are also possible up to 1000° C. The electrostatic analyzer (charge state and energy analyzer) is also shown.

The silicon substrate had a thickness or the order of 400 microns and boron nitride films were deposited thereon having a thickness of approximately 0.1 microns. Once the system had been set-up, aligned and calibrated, films were produced from the plasma in a relatively short time frame on the order of about 15 minutes.

Figure 12:
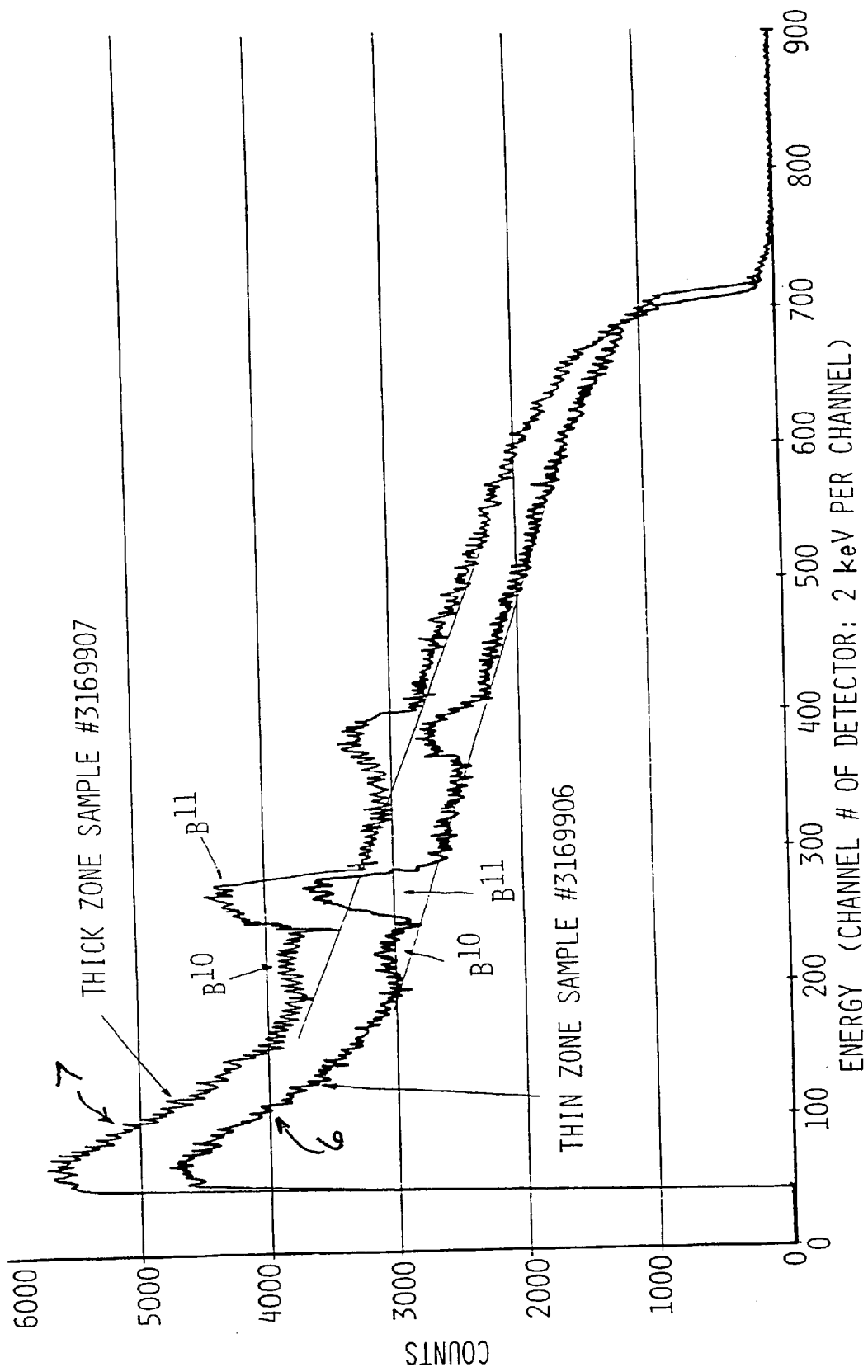
FIG. 12 shows the Rutherford backscattering spectra of a deposition process conducted in accordance with the experimental system shown in FIG. 10.
Figure 13:
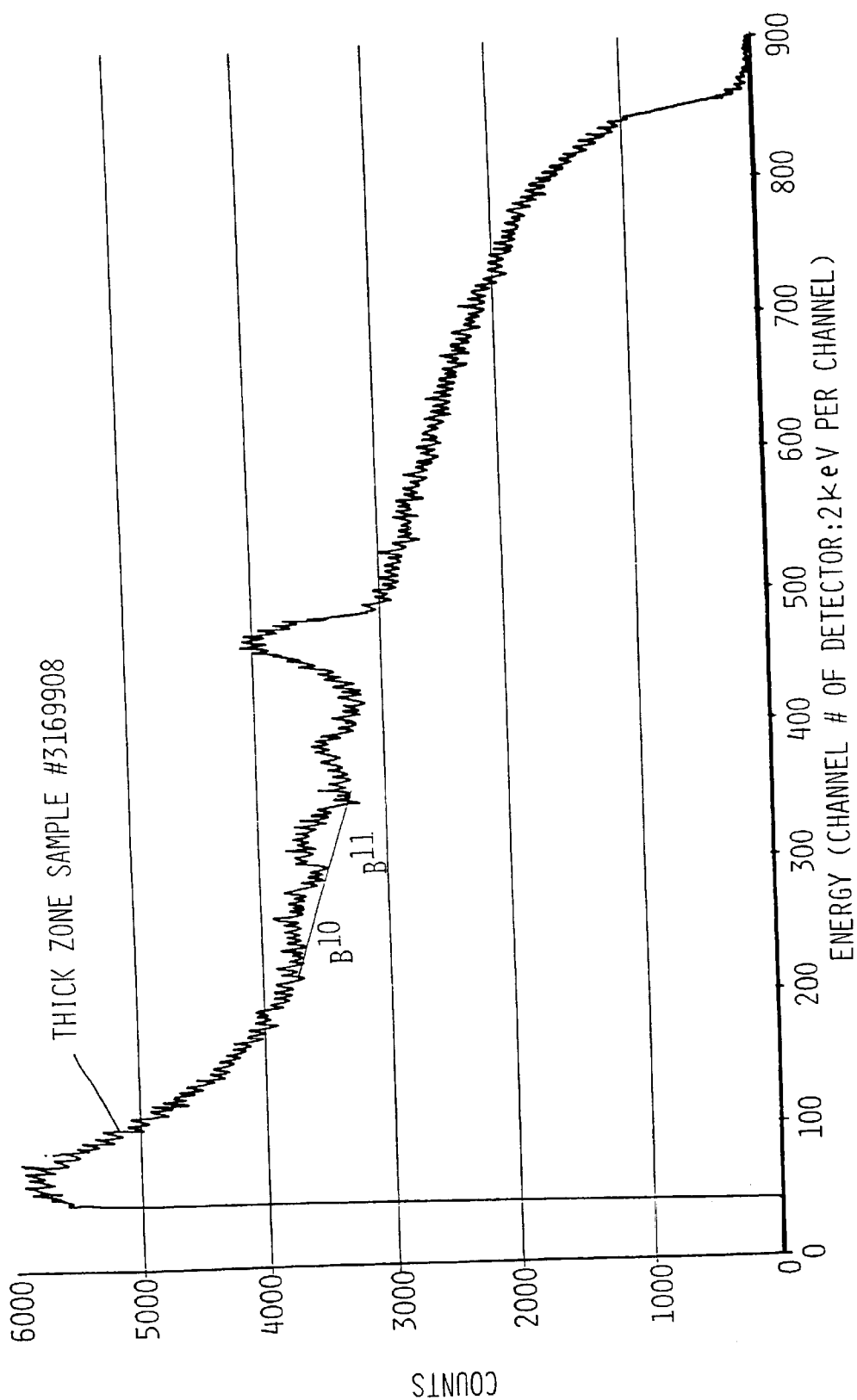
FIG. 13 shows the Rutherford backscattering spectrum of a deposition process conducted in accordance with the experimental system shown in FIG. 10.

The results of the deposition process are shown in Table I and corresponding graphs of FIGS. 12 and 13. Table I contains as a first entry, a listing of the relative abundance in nature of B(11) and B(10). The natural occurring ratio of B(11):B(10) is about 4:1. The data entry designated as BN3169906 (−906) was taken from a relatively thin zone of the film. As shown in FIG. 11, the film thickness decreases from the center toward the outer edge of the substrate. An analysis of this thin part of the film, based on Rutherford ion beam analysis, shows the counts for B(10) and B(11). The ratio of B(11) to B(10) at the −906 data point is relatively rich in B(11) (i.e., depleted in B(10)). Here, the amount of B(10) is on the order of 17% whereas its naturally occurring amount is close to 20%. The amount of B(11) in the −906 sample is close to 82%, whereas its naturally occurring amount is about 80%.

Samples 3169907 (−907) and 3169908 (−908) were taken from portions of the film designated as thick and near the center of the substrate. This is also schematically shown in FIG. 11. In the −907 sample, B(10) was on the order of 30% and B(11) on the order of 70%. Here it is clearly seen that the amount of B(10) isotope present in this zone of the film is very much greater than the naturally occurring amount which is about 20%. Sample −908 (FIG. 13) confirms the results found in sample −907. In sample −908, isotope B(10) was present in an amount close to 35% based on the sample count of B(10) by the Rutherford scattering method, and B(11) count was on the order of 65%. Here it can be seen that the amount of B(10) is very highly enriched as compared to its naturally occurring amount with respect to B(11). Referring back to curve 6 of FIG. 12, (sample −906 taken from the thin portion of the film) it is possible to subtract out the effect of the silicon substrate by virtue of the line, and look above the line for the peak in the vicinity of channel 200 which shows B(10) in a relatively small proportion for curve 6. The proportion of B(10) in the thick portion of the film is the upper curve labeled curve 7. Here the proportion of B(10) is greater than that which naturally occurs. B(11) peak is shown closer to the channel 300 on the curves. Overall, it can be seen that the proportion of B(11) to B(10) in curve 6 is higher than the proportion of B(11) to B(10) in curve 7.

FIG. 13 contains results corresponding to sample −908. Sample −908 was taken near the relatively thick center of the film B(10) is shown as a peak in the vicinity of channel 200 and B(11) is shown in the vicinity of channel 300. Here the proportion of B(10) is higher than either of the samples −907 or −906. It should be noted that the peak near the channel 400 of the X axis of all the curves corresponds to nitrogen. In all cases, the baseline represents the silicon substrate.

Figure 14A:
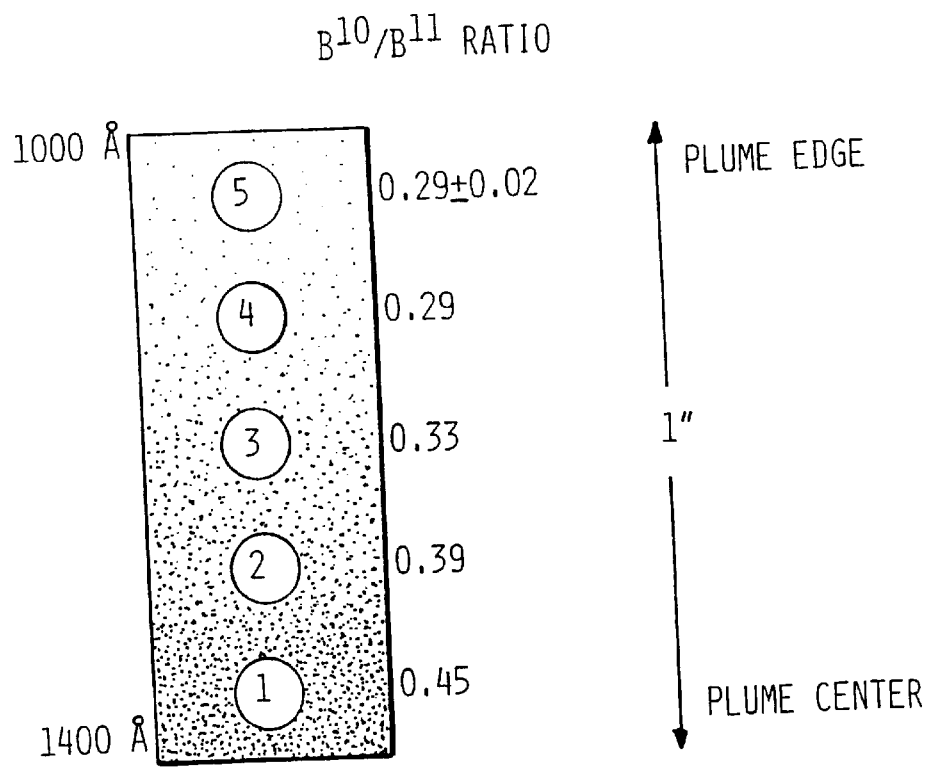
FIG. 14A shows 5 sampling spots of the film taken at separate areas over a 1" region of the film. Sample 1 is at the thickest region (plume center) and samples 2–5 are at progressively thinner regions away from the center. The ratio of $B^{10}/B^{11}$ decreases from sample 1 (at $B^{10}/B^{11}$ of 0.45) to sample 5 (at $B^{10}/B^{11}$ of 0.29). Sample 5 (thinnest region) has $B^{10}/B^{11}$ ratio closest to that which naturally occurs (0.25).
Figure 14B:
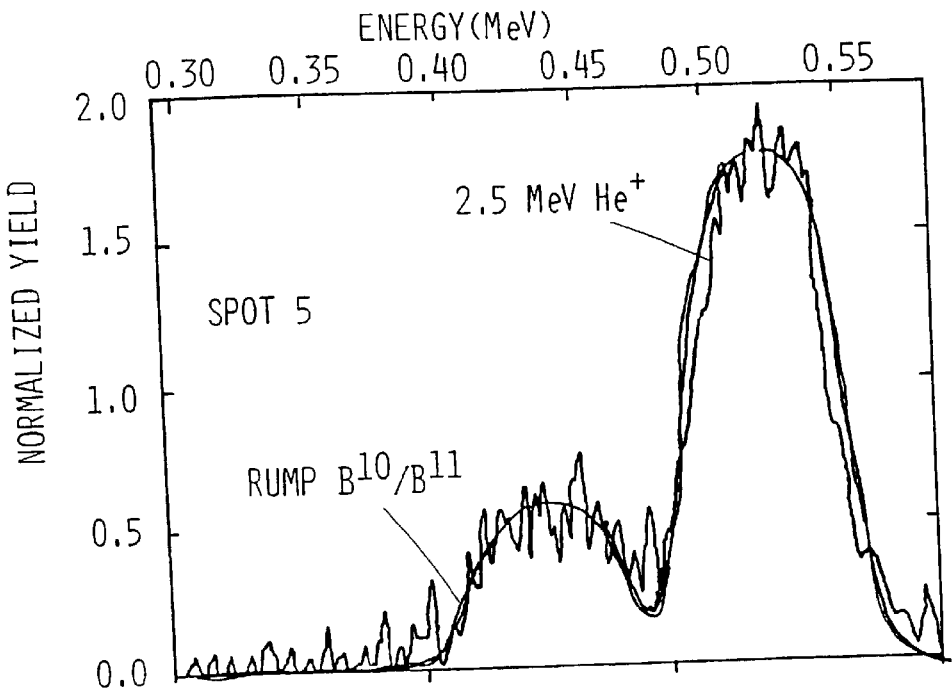
FIG. 14B is for spot 5 (thin) and FIG. 14C is for spot 1 (thick). Note that the vertical scales in 14B and 14C are different.
Figure 14C:
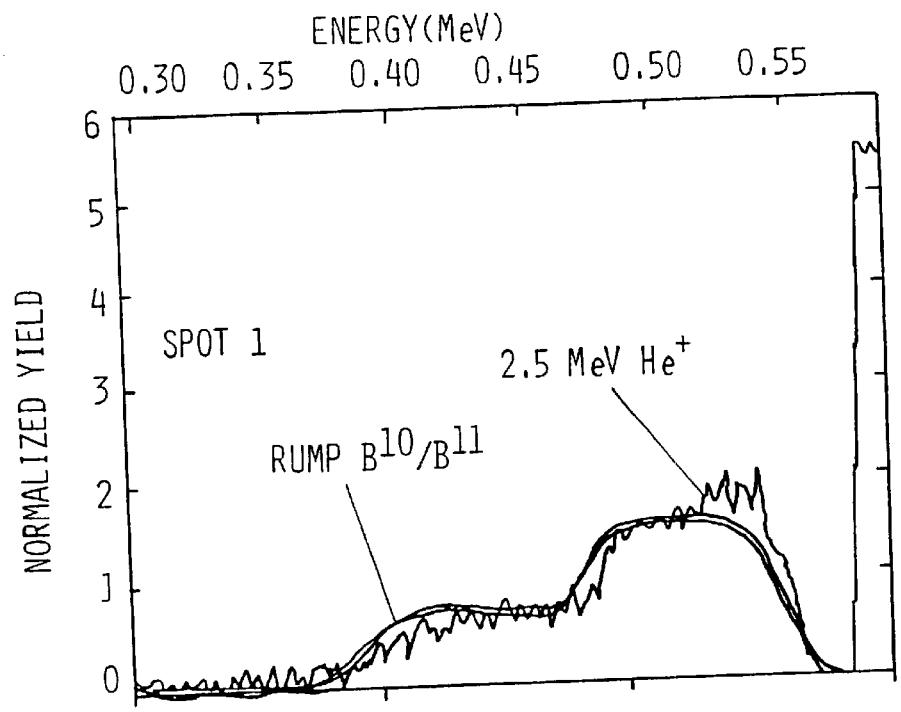
Figure 15A:
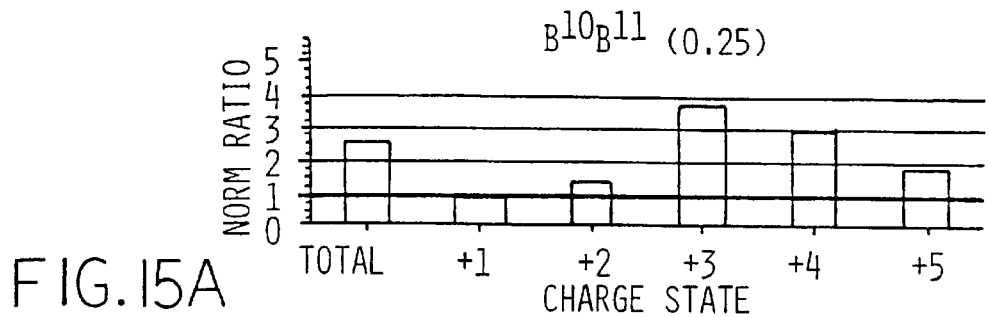
FIG. 15 shows isotope ratios, normalized to the natural abundance ratio (shown in parenthesis) for boron (15a), zinc (15b), titanium (15c), gallium (15d), and copper (15e) as a function of charge state. Ablation plumes were generated from solid targets with 780 nm, 200 fs, $2\times10^{14}$ W/Cm$^2$ laser pulses, to produce results as shown in FIG. 15, parts (a) to (e).
Figure 15B:
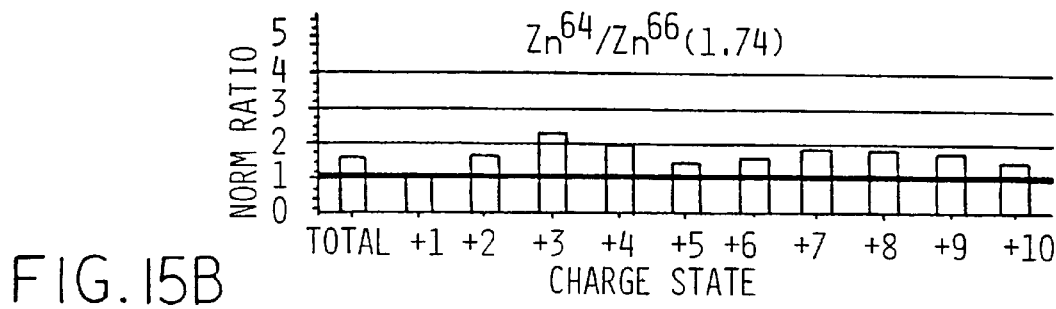
Figure 15C:
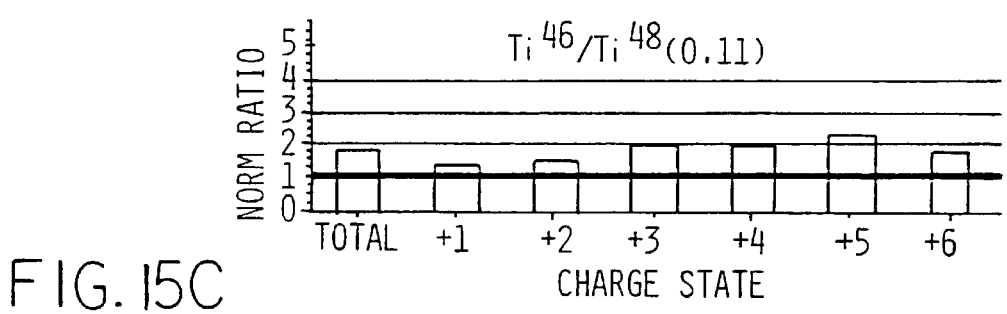
Figure 15D:
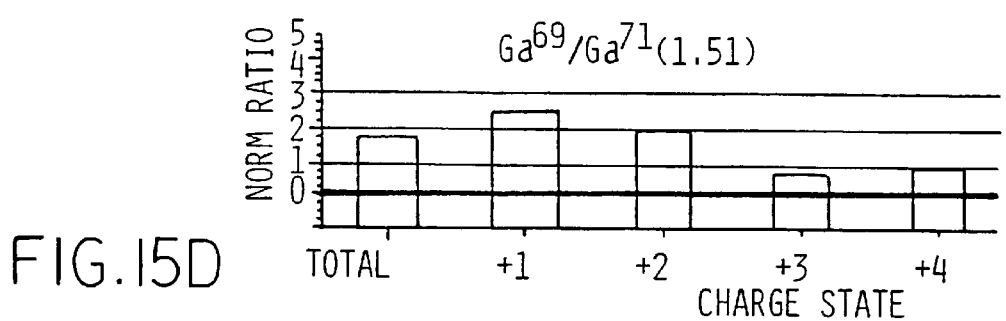
Figure 15E:
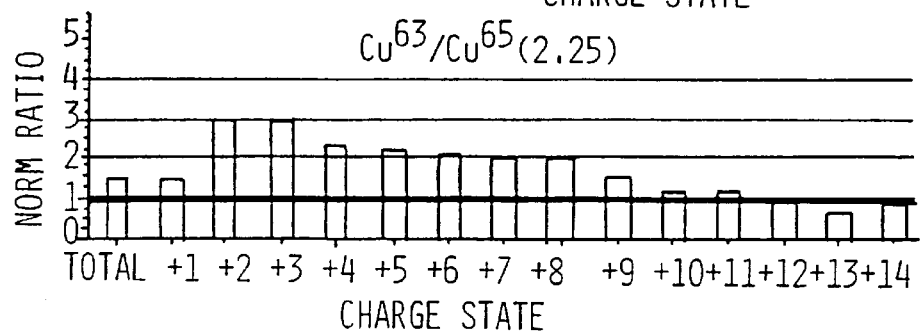

The BN film was analyzed by Rutherford backscattering (RBS) at 5 spots of 3 mm size over a range of 1", as shown in FIG. 14A. The RBS spectrum was fit using the commercially-available computer program RUMP. The silicon background was subtracted out and the B(10) to B(11) ratio was fit as shown in FIGS. 14B and 14C for different spots on the film. The thickest region of the film was sampled at spot (1) which corresponds to the deposition from the central part of the plume. The thinnest region of the film was sampled at spot (5) which corresponds to the outer part of the plume. The B(10)/B(11) ratio is maximum for the film captured from the plume center and decreases toward the naturally-occurring ratio away from the center.

The experimental set-up of FIG. 1 was used in further experiments, using the method applied to boron and gallium.

The method applied to boron and gallium produced measured factors greater than 2 for isotopic enrichment in the multiple-charge-state ions from ultrafast laser ablation plasmas. Such methods applied to the elements Zn, Ti, and Cu produced results which confirm the enrichment of the lighter isotope on the target-normal axis of the expanding ablation plume (see FIG. 15). Angular scans of these plumes for boron demonstrated the persistence of the enrichment effect to wide angle, being present as far out as 45 degrees from the normal direction (central axis). Systematic variations in the dominant ion species and their energy distributions, as a function of charge state, are observed in these angular scans (see for example FIG. 16).

Deposition of isotopically-enriched thin films appear to be strongly influenced by the ratio of ionic to neutral-atom species in the plasma. The data here demonstrate a relationship between the ion to neutral atom ratios in the plumes and the laser operating parameters. A variety of techniques were employed to show such ratios as a function of laser operating parameters, including deflected versus non-deflected neutral species in the ion energy analyzer, laser probe deflection in the refractive portion of the ablation plasma, emission spectroscopy, and Langmuir probe measurements. In general, the neutral species were observed to have several factors of 10 lower energies than the ions. Likewise, the data indicates that laser operating parameters are used and adjusted to maximize or minimize the ionic to neutral specie ratios in the plume. It is thought that secondary laser pulses which act as plasma pumping pulses could significantly change the ion to neutron ratio and thereby provide greater enrichment.

Figure 16:
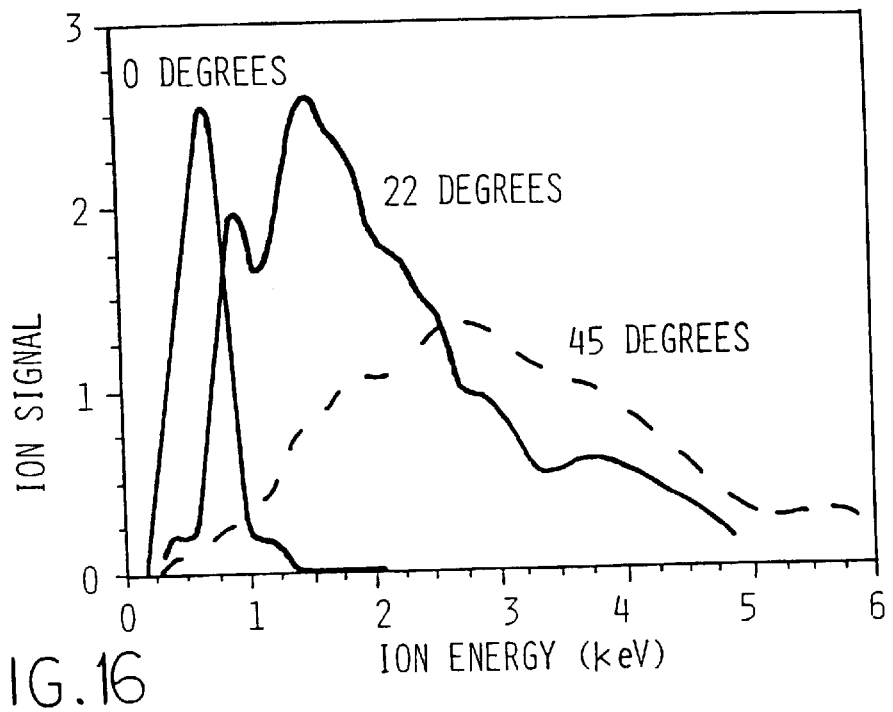
FIG. 16 shows angular dependence of boron 11 charge state +3 energy distribution for ablation of a solid target with 780 nm, 60 fs, $5\times10^{14}$ W/cm$^2$ laser pulses. Angles are measured with respect to the target normal.

FIG. 15 shows the isotopic ratios of several elements from the periodic table, as a function of charge state, as observed in ultrafast laser ablation plasmas. In FIG. 16 are the results of an angular scan showing the variation in energy distribution, as a function of angle from normal for moderate-intensity ablation ($5 \times 10^{14}$ W/cm$^2$). These results are consistent with the model of a plasma centrifuge for separation of ions according to kinetic energy. This plasma centrifuge is thought to be controlled by the longitudinal magnetic field of the laser ablation plasma. It is thought that the expanding plasma produces a strong magnetic field that provides a rotational component to the ions as they explode (expand) away from the ablating surface.

These results demonstrate a kinetic energy separation for the ion energy distributions as a function of observation angle relative to the target normal. Such kinetic energies are proportional to the first power of the mass and second power in velocity (K.E.=½ mv$^2$), thus confirming the presence of lower mass ions (with lower velocity) near the zero (or central) axis.

The results shown in FIGS. 15 and 16 for the various elements are consistent with the results obtained for boron. Returning to the data for boron, Table II shows the integrated areas under each of the charge-state curves presented in FIG. 3. The ratios of these areas are also presented which provides a measure of the total isotope enrichment associated with each charge state of boron. An interesting pattern is seen in the case of vacuum ablation where charge state +3 has the largest (nearly 1:1) ratio of the light to heavy isotope. This is followed by charge state +4 which has the next most highly-enriched condition. It is also observed that the highest total yield of ions is for the +4 charge state.

In summary, the invention provides an isotopic enrichment process in laser ablation plumes. This effect was demonstrated in the ion energy spectra of laser ablated boron nitride and gallium nitride materials. The effect was first observed using 150–200 femtosecond pulses and has also been seen using 200 picosecond and 6 nanosecond pulses. It appears to be more pronounced in the short pulse case (fs) but is also clearly observable in the longer pulse case (ns). The manifestation of this effect occurs in the yields obtained for the boron 10 compared to boron 11, as well as for gallium 69 versus gallium 71. These isotopes are present in the ionically charged species of the laser ablation plume. The naturally occurring abundance of boron 10 to boron 11 is 19.78% to 80.22%, nominally 20/80 ratio. In the ion energy spectra reported for the enriched zone of the plume, as a function of ion-charge state and ion energy, there are ratios that are greater than 50/50 and in most circumstances always greater than the naturally occurring 20/80 ratio. These differences seem to vary with Ion charge state, ion energy and laser pulse duration. In addition, the isotope enrichment is generally larger for gallium, which suggests an important dependence on the target mass.

In the systems described herein, the laser pulse was focused to the surface of the ablation target and the ablation plume left the surface of the target approximately in a normal direction expanding into the region surrounding it. This region constituted a high vacuum or an enclosure containing a dilute background gas. The particles in the plume consisted of electrons, ions, and neutral atoms or molecules. These neutrals may or may not be in excited states. The plume was captured so as to provide zones containing isotope distribution different from the natural abundance. The results, as presented above, are unusual and unexpected. This is because isotope separation, as a process, is normally done by taking advantage of known features such as mass diffusion or difference in atomic vibrational modes. The process described herein is completely different.

While not wishing to be held to any particular theory, one possible explanation for the effect could be found in the nature of atomic collisions for large backward angles in the present case. The laser ablation process is produced when the laser beam is absorbed by the material at its surface resulting in an intensely ionized and very dense plasma. This plasma expands outward away from the surface and inward at the same time. The inward going portion is reflected by the solid surface beneath it and is scattered back in a rearward direction reinforcing the original outward moving plasma front. For ultrafast pulses (fs and ps) the plasma at the surface will be very thin (a few hundred angstroms) and the collisions producing the backward directed motion will consist of predominantly ions that scatter at approximately 180 degrees. The observation angle for the detector is at exactly 180 degrees with, in addition, a very small acceptance angle, on the order of 0.1 degree.

In reviewing the above results, several possible phenomena and properties are to be considered. They are summarized here. The effect is restricted to the first few hundred angstroms below the surface of the material. Screened coulomb collision mechanisms and other possible screened potentials seem to pertain. Mass differences play an important role in the process. Shallow angle collisions just prior to the main ultra-low impact parameter backscattering event seem to be relevant to the process. Recoil of the target nucleus seem to be a factor in the enhancement. The angular width of the effect varies with ion energy, charge state and target mass. The effective depth over which the process occurs is a function of ion mass and energy and the target mass. In addition, variations in the plasma distribution can produce a type of electromagnetic lens which selects and focuses ions according to charge state and energy. Therefore, a filtering effect can be based upon collisional filtering or electromagnetic filtering. It is clear that the plasma plume has an angular distribution pattern with the central cone preferential with the lighter isotope. This is thought to be because when the plume comes off the target, there is an angular distribution pattern for the isotopic species.

All of these parameters seem to be important when comparing light and heavy isotopes that are involved in a wide angle 180 degree scattering event. By using scaling, it is expected that the angular width of the effect observed here will be on the order of 8 to 10 degrees from the surface normal. This will result in an isotopically enriched circular zone of about 1 centimeter radius near the center of the deposited film, if that film is deposited at a typical 7.5 centimeters away from the ablation source. At one meter from the ablation source the angular width will produce a circular zone of enrichment that is on the order of 14 centimeters in radius. It is evident that this process is adaptable to commercial scale-up.

As stated above, data was collected for the 6 nanosecond pulse duration, 150 to 200 femtosecond pulse duration, and also for an intermediate pulse duration of 230 picoseconds. With gallium, the effect at 230 picoseconds appears to be diminished relative to the 150 femtosecond case. With boron, there is no clear trend in B(10)/B(11) ratios from 200 femtoseconds to 230 picoseconds to 6 nanoseconds. In particular, there is a charge state dependent isotope enhancement for certain conditions, shown most strongly in the +3 charge state of FIG. 6B. However, the total yield is decreased in the nanosecond case, relative to the picosecond and femtosecond cases. The gallium and boron data suggests that there is a relative optimum pulse duration for obtaining the ablation effect.

As a result there is a very thin layer on the order of 200 angstroms where the process occurs, the correlated collisions occur within a very shallow depth. This enhancement or optimization of the backscattering mode seems to be dependent on the mass, energy and charge. It appears that the cone in which the effect occurs is dependent on the mass of the scattering atoms. The heavier the mass of the scattering atoms, the bigger the cone. Conversely, the lighter the mass of the scattering atoms, the smaller the cone. From the data obtained in the B(10) and B(11) relationship, it appears to show that the mass effect is there and the charge effect is there. The screen charge appears to be related to why the different charge states provide different isotopic ratios. Therefore, the data clearly suggests there is a mass dependence in the scattering and a charge dependence in the scattering and the width of the cone is controlled by that. Both of these dependencies namely charge and mass are observed in this work.

Backscattering as used herein designates traveling of particles in a direction opposite to that of the path of the energy. In this case, backscattering is not related to the angle of incidence of the laser. In contrast, backscattering as defined herein is the reaction of the particles to the movement of the plasma in a direction into the material. This effect is the result of the formation of the plasma after the laser pulse has delivered its energy.

It is thought that pulse width on the order of hundreds of picoseconds or less, which cause ablation in plasma formation while minimizing thermal effects, are preferred. This generates a relatively dense plasma from which the ions expand. There may be a slight material dependence with respect to the preferred pulse duration or pulse width. Methods for generating short pulses such as 200 ps or less or 10 ps or less are described in U.S. Pat. No. 5,656,186.

It is not fully known from the present experiments if the process is significantly wavelength dependent. Preliminary experiments suggest the effect is very small, or may not be present, for 353 nm (i.e., near UV). The work was done in the near IR at about 1 micron. There could be useful results for the near UV wavelength range since it is known that such laser pulses, even when relatively long and in the nanosecond range, are absorbed over a very thin layer of only a few hundred angstroms. It is therefore thought that the process of the invention is workable in the ultraviolet wavelength range with longer (nanosecond) pulses.

Therefore, wavelength on the order of 198 nanometers (nm) to 2.5 microns is thought to be useful along with pulse widths on the order of nanosecond to femtosecond with energy fluences in the range of millijoules/cm$^2$ to hundreds of joules/cm or more, and intensities on the order of $10^9$ to $10^{17}$ watts/cm$^2$. Extreme relativistic electron effects become significant above $10^{18}$ watts/cm$^2$ and could provide new processes relating to the herein observed isotope enrichments. It is thought that the preferred range is 0.8 micron wavelength with 100 femtosecond pulses at $10^{15}$ to $10^{17}$ watts/cm$^2$ laser intensity.

In the case of femtosecond short pulses, the absorption depth of the energy is relatively shallow. In the case of a relatively long wavelength, there may be a trade-off between a relatively deep absorption depth and the length of the pulse. For example, a longer pulse at a longer wavelength is thought to affect a greater depth of material and the isotope enrichment effect may be less as per the data in the 6 nanosecond case.

The process does not have to be done in a vacuum, however that is the cleanest way to get a film. It could be done in a background gas (as shown earlier) and even conceivably in air. Doing this in air (or other gas at atmosphere, or above) could, in fact, be an interesting way to make isotopically enriched particulates. The size of these could be controlled by the gas pressure.

It is not thought that repetition rate of the laser plays an important role except that the growth rate of the film will be affected thereby. The energy level of the laser is important and it is desired to ablate material and form the plume without residual thermal effects into a substantial bulk of the ablated material.

Energetic ions have a very wide range of initial energies and charge states in the laser ablation plasma. As such, they represent a very rich source of diagnostic probe particles. Appropriate detectors can examine spatial and energy distributions of various charge states in order to understand phenomena taking place within the ablation plasma. Experimental results herein show how such swift ionic charge states are affected by passage out of the ablation plume and what effect occurs as a function of observation angle about the normal to the ablating surface. These experiments make it clear that observing energetic ions as a function of energy, mass, and spatial (angular) distribution represents a rich source of information. Such data provides valuable information on the force fields affecting these ions beyond conventional fluid dynamic forces and hydrodynamic processes. FIG. 17 shows an example of such measurement where the effects of laser wavelength and pulse duration are examined relative to isotopic mass ratio analysis.

Interesting variations of isotopic ratios are seen as a function of laser wavelength and particle charge-state. It is thought that these variations are directly related to the time development, strength, and orientation of the magnetic fields in the ablation plasma through which the swift ions pass. Ions of different charge state travel at different velocities relative to the beginning of the ablation pulse. These ions then pass through the plasma magnetic fields at different times relative to the build up and decay of the magnetic fields. Thus, such ions serve as a probe for determining the growth rate and duration of such fields. It is noteworthy that the isotopic separation of ions seen in FIG. 17 is a minimum for experiments done in the UV (353 nm) compared to the IR (1.06 micron) and near IR (780 nm). This implies a wavelength dependence of the magnetic-field-generating mechanisms. The angular distribution of ejected ions as a function of charge state, energy, and mass were examined. These experiments suggest strongly that there are pronounced kinetic energy dependencies to such angular distributions. Again, this is thought to be due to the presence of magnetic fields within the plasma through which the ions penetrated.

Figure 18:
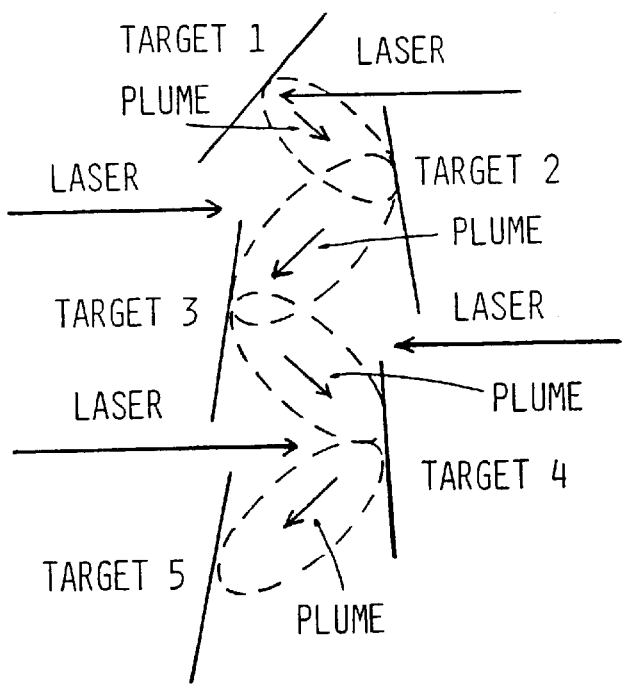
FIG. 18 shows a multi-stage arrangement of laser beams and enrichment targets. The system is useable with laser beams operated simultaneously or sequentially.

FIG. 18 shows a multi-stage arrangement of laser beams and enrichment targets. The system is operable with all laser beams and targets run simultaneously or sequentially. In one embodiment, all targets are the same material, and as time goes on each target is enriched in a selected ionic species. The last target down the chain will have the greatest enrichment, due to the multiplication effect that occurs. If it is desired to achieve enrichment of the lighter isotope, then the laser is directed to the inner conical region of the deposit formed by ablation of the upstream target in the cascade arrangement. It if is desired to achieve enrichment of a heavier isotope, then the laser is directed to the annular region outside the inner conical region of the deposit formed by ablation of the upstream target.

Assuming that the lasers and targets are nominally the same and operation of the laser is the same, a dynamic equilibrium condition arises. Here, the rate of material added, for example, at target 2 is equal to the rate of material removed from target 1. After some desired period of operation, the last target in the chain is the most enriched with respect to a selected isotope.

In another embodiment, the irradiation of targets is conducted sequentially to provide progressively enriched films in the cascade arrangement of FIG. 18. Thus, an initial spatial separation of isotopes occurs by irradiating (ablating) target 1 whereby a deposit is formed having a relatively enriched region and lean region for a selected isotope. Such deposit forms the second target and one of the regions thereof is irradiated to provide further isotope separation.

Significantly, the isotopic enrichment is clearly observed in the ablation ion spectra and in the deposited films. The commercial implications are evident. Products having desired isotope distribution are able to be produced from the process. Multiple iterations of film formation may be used to increase the isotope concentration. The film formed in a prior iteration becomes the subsequent target to produce a desired result. Multiple deposition steps are also useable to form multi-layer films. The process and system apparatus are adaptable to commercial use and automated production. Therefore, isotope enriched products are obtainable by the methods and system of the invention.

Although not wishing to be held to a particular theory, the enrichment effects observed in this work most probably involve interaction of charged ion species in the laser plasma with intense magnetic fields formed by the laser just ahead of the plume expansion process. It is less likely that the observed effects are associated with isotope production through laser-induced nuclear reaction processes. The laser intensities used in this work ($10^{13}$ to $10^{15}$ W/cm$^2$ seem too low for such events to occur. Intensities 4 to 5 orders of magnitude greater are thought to be necessary for photo-induced (n,γ) reactions to occur via optically-energized electrons.

It is thought that both toroidal and axial magnetic fields are generated within laser-induced plasmas and that these fields, near the surface of the ablation target, are on the order of 0.6 MG for laser intensities around $10^{15}$ W/cm$^2$. The time development of the toroidal field precedes that of the axial field and in so doing provides a trans-radial impulse to the ion velocities. The presence of an axial field provides the conditions for a plasma centrifuge mechanism to operate in producing the isotope separation we observe. The intensity of both fields decreases monotonically away from the surface of the ablating target. Data demonstrates that an inverse power law decrease In the axial field occurs over distances of about 150 μm from the ablation surface. By extrapolating an initial 0.5 MG field to large distances, one can estimate the axial field strength along the path toward a deposition substrate on which the isotopically-enriched films are grown. Using a −0.33 power law dependence for the axial field strength as a function of distance for a laser intensity of $2 \times 10^{14}$ W/cm$^2$, there is obtained a spatially-averaged field strength of 44 kG across the 7 cm distance from our ablation target to the deposition substrate. Since the axial field is considered to be produced by a dynamo action within the plasma itself, one might expect that the field is retained within the plasma plume as it moves toward the deposition site. This would provide the necessary geometry for a plasma centrifuge-like condition to be established. Such a process provides a mechanism by which enrichment of the light isotope occurs on the zero radial spot of the plume.

A basic plasma centrifuge equation yields a separated enrichment ratio in terms of the radial distance from the center of an axial magnetic field: $R(r)/R_0 = \exp(\Delta m \omega^2 r^2 / 2kT)$, where $R(r)$ is the ratio of the heavier to lighter ion species at radius r normalized to the ratio on axis, $R_0$. The enrichment depends on the isotope mass difference Δm, the angular plasma rotation rate ω, Boltzmann's constant k, and the plasma temperature T. Based on the data shown in FIG. 14, for a factor of 2 enrichment and a radial separation of enriched isotopes of 2.5 cm, there is a rotation rate of $3.3 \times 10^5$ rad/sec. The value of the equilibrium plasma temperature is taken as 0.5 eV and is based on typical electron temperatures measured for similar pulses in titanium using optical emission line ratios from spectroscopic emission data. Comparing the present results with the operating parameters of conventional plasma centrifuges allows for an estimate of the magnetic fields involved in the present experiments. Using this approach, the present minimum plasma rotation rate corresponds to a uniform axial magnetic field distributed over the space between the ablation target and film substrate of 4 kG. As stated above, the extrapolated spatially-averaged field across this region is 44 kG. Thus, the predicted average axial field is more than sufficient to cause the isotope separation observed in the present experiments. Accordingly, a plasma centrifuge mechanism is consistent with the results presented here.

The present invention also provides a method for measuring internal magnetic fields of laser ablation plasmas. This is a uniquely valuable scientific result, in addition to the use of the inventive technique as a simple and direct means to obtain isotopically-enriched materials. It is also useable to obtain other fundamental information about laser plasmas derivable from such observations. This includes information about ion and electron densities, internal atomic and ionic collisions, ion and electron temperatures, ion accelerating fields, and other internal electromagnetic field conditions. From a practical standpoint, the direct deposition of engineered isotopically-enriched thin films is an important advantage provided by the present invention.

TABLE I

ISOTOPE RATIOS FROM RBS MEASUREMENTS

| | Ratios | | Abundances | | |
|---|---|---|---|---|---|
| | $B^{11}/B^{10}$ | $B^{10}/B^{11}$ | $B^{10}$ | $B^{11}$ | |
| Natural | 4.0556 | 0.2466 | 19.78% | 80.22% | |
| BN 3169906 | 4.8662 | 0.2055 | 17.05% | 82.95% | thin region |
| BN 3169907 | 2.3360 | 0.4281 | 29.98% | 70.02% | thick region |
| BN 3169908 | 1.8717 | 0.5343 | 34.82% | 65.18% | thick region |

TABLE II

| Charge State | Vacuum | | | N$_2$ Backfill | | |
|---|---|---|---|---|---|---|
| | $B^{10}$ | $B^{11}$ | Ratio | $B^{10}$ | $B^{11}$ | Ratio |
| +1 | 1.77 | 6.06 | 0.29 | 42.19 | 72.44 | 0.58 |
| +2 | 3.65 | 10.48 | 0.35 | 1.34 | 3.70 | 0.36 |
| +3 | 19.03 | 20.09 | 0.95 | 2.94 | 7.90 | 0.37 |
| +4 | 22.68 | 30.96 | 0.73 | | | |
| +5 | 5.04 | 10.92 | 0.46 | | | |
| Total | 52.17 | 78.50 | 0.66 | 46.47 | 84.04 | 0.55 |

Table II.
Total Boron Ion Counts (integrated over ion energy), separated by isotope and charge state from FIG. 3.
Laser ablation plumes are from 200 fs, 50 J/cm$^2$ laser pulses in vacuum, and in 0.8 mTorr N$_2$ backfill.

While preferred embodiments, forms and arrangements of parts of the invention have been described in detail, it will be apparent to those skilled in the art that the disclosed embodiments may be modified. Therefore, the foregoing description is to be considered exemplary rather than limiting.

What is claimed is:

1. A method for separating isotopes of an element comprising:
   a) directing a laser beam onto a surface of a target at an intensity and wavelength sufficient to generate plasma comprising ionized isotopic species and to generate an internal electromagnetic scattering field within said plasma causing spatial separation of said ionized isotopic species; and
   b) depositing said spatially separated ionized isotopic species on a substrate, whereby a deposit is formed having a first region which is relatively rich in a selected isotopic species and a second region which is relatively lean in said selected isotopic species.

2. The method of claim 1 wherein said intensity is in a range of about $10^9$ watts/cm$^2$ to $10^{18}$ watts/cm$^2$.

3. The method of claim 1 wherein said wavelength is in a range of about 200 nanometers to about 1 micrometer.

4. The method of claim 1 wherein said laser beam comprises one or more pulses each having a duration in a range of nanoseconds to femtoseconds.

5. The method of claim 1 further comprising:
   c) directing an additional laser beam onto a selected one of said first and second regions at an intensity and wavelength sufficient to generate a second plasma comprising ionized isotopic species and to generate an internal magnetic field within said second plasma causing spatial separation of said ionized isotopic species of said selected region; and d) depositing said spatially separated ionized isotopic species of step (c) on a substrate, whereby a second deposit is formed having a third region with an isotopic distribution different from said selected region.

6. The method of claim 1, wherein said step of directing the laser beam corresponds to directing the laser beam onto a solid material target, thereby essentially simultaneously vaporizing the solid material, generating the plasma, and generating the internal magnetic scattering field in one step.

7. A method for separating isotopes of an element comprising:

a) directing a laser beam onto a surface of a target having a first isotopic distribution, at an intensity and wavelength sufficient to generate a plasma comprising ionized isotopic species, and to generate an internal electromagnetic scattering field within said plasma, causing spatial separation of said ionized isotopic species; and b) depositing said spatially separated ionized isotopic species on a substrate whereby a deposit is formed having a region with a second isotopic distribution different from said first isotopic distribution.

8. The method of claim 7, wherein said step of directing the laser beam corresponds to directing the laser beam onto a solid material target, thereby essentially simultaneously vaporizing the solid material, generating the plasma, and generating the internal magnetic scattering field in one step.

* * * * *